US012707006B2

(12) United States Patent
Sun

(10) Patent No.: US 12,707,006 B2
(45) Date of Patent: Aug. 11, 2026

(54) METHOD AND APPARATUS FOR SHARING DEVICE

(71) Applicant: HONOR DEVICE CO., LTD., Shenzhen (CN)

(72) Inventor: Huiping Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 398 days.

(21) Appl. No.: 18/278,055

(22) PCT Filed: Aug. 25, 2022

(86) PCT No.: PCT/CN2022/114932
§ 371 (c)(1),
(2) Date: Aug. 21, 2023

(87) PCT Pub. No.: WO2023/030169
PCT Pub. Date: Mar. 9, 2023

(65) Prior Publication Data

US 2024/0137437 A1 Apr. 25, 2024
US 2024/0236226 A9 Jul. 11, 2024

(30) Foreign Application Priority Data

Aug. 31, 2021 (CN) ......................... 202111013653.X

(51) Int. Cl.
*H04M 1/72412* (2021.01)
*G06F 3/14* (2006.01)

(52) U.S. Cl.
CPC .......... *H04M 1/72412* (2021.01); *G06F 3/14* (2013.01); *H04M 2201/42* (2013.01)

(58) Field of Classification Search
CPC ............................ H04M 1/72412; G06F 3/14
See application file for complete search history.

(56) References Cited

U.S. PATENT DOCUMENTS 9,794,975 B1 * 10/2017 Porala .................... H04W 4/14
2017/0142124 A1 5/2017 Mukhin et al.
(Continued)

FOREIGN PATENT DOCUMENTS

CN 108121210 A 6/2018
CN 108848484 A 11/2018
(Continued)

*Primary Examiner* — Curtis B Odom
(74) *Attorney, Agent, or Firm* — WOMBLE BOND DICKINSON (US) LLP

(57) ABSTRACT

Embodiments of this application provide a method and an apparatus for sharing a device. The method is: A first electronic device displays a first interface, where the first interface includes N to-be-shared devices; the first electronic device receives an operation that a user selects a target device and a target user, and displays a second interface, where the second interface includes a plurality of options, different options in the plurality of options correspond to different use permissions, and different use permissions allow the target user to use different function properties; the first electronic device receives an operation that the user selects a target option from the plurality of options and an operation that the user determines to share the target device with the target user by using a use permission corresponding to the target option.

20 Claims, 34 Drawing Sheets

(56) References Cited

U.S. PATENT DOCUMENTS

| | | | |
|---|---|---|---|
| 2022/0052870 | A1 | 2/2022 | Guo et al. |
| 2022/0397992 | A1 | 12/2022 | Xie |

FOREIGN PATENT DOCUMENTS

| | | | |
|---|---|---|---|
| CN | 109361936 | A | 2/2019 |
| CN | 109525537 | A | 3/2019 |
| CN | 109788005 | A | 5/2019 |
| CN | 109917667 | A | 6/2019 |
| CN | 109995709 | A | 7/2019 |
| CN | 111147661 | A | 5/2020 |
| CN | 112560013 | A | 3/2021 |
| CN | 113009838 | A | 6/2021 |
| CN | 113032766 | A | 6/2021 |
| CN | 113960930 | A | 1/2022 |
| WO | 2019105058 | A1 | 6/2019 |
| WO | 2020155014 | A1 | 8/2020 |

* cited by examiner

METHOD AND APPARATUS FOR SHARING DEVICE

CROSS-REFERENCE TO RELATED APPLICATIONS

This application is a national stage of International Application No. PCT/CN2022/114932, filed on Aug. 25, 2022, which claims priority to Chinese Patent Application No. 202111013653.X, filed on Aug. 31, 2021. The disclosures of both of the aforementioned applications are hereby incorporated by reference in their entireties.

TECHNICAL FIELD

This application relates to the terminal field, and in particular, to a method and an apparatus for sharing a device.

BACKGROUND

With the development of science and technology, smart household has been substantially popularized to people's life. A user may operate (for example, enable, disable, time, or perform a remote operation on) a smart household device at home by using a smart household application (application, APP), so that user experience can be significantly improved.

Currently, the smart household APP further supports sharing of a smart household device between family members. For example, a user A may share a device 1 with a user B, so that the user B can operate all functions of the device 1.

However, for some devices requiring high security, once the user B incorrectly operates the devices, great impact may be caused to family security. For example, if a remote door opening function of a door lock is incorrectly operated, there is a great risk to both safety of family property and personal safety.

SUMMARY

Embodiments of this application provide a method and an apparatus for sharing a device, to specify a permission of a user to be shared with, thereby reducing a security risk caused by an incorrect operation of the user to be shared with.

According to a first aspect, an embodiment of this application provides a method for sharing a device, and the method includes: A first electronic device displays a first interface, where the first interface includes a first control and N to-be-shared devices, N is an integer greater than or equal to 1, and the first control is configured to indicate that the first interface is an interface for sharing a device; the first electronic device receives an operation that a user selects a target device from one or more to-be-shared devices; the first electronic device receives an operation that the user selects a target user; the first electronic device displays a second interface, where the second interface includes a plurality of options, different options in the plurality of options correspond to different use permissions, and different use permissions allow the target user to use different function properties; the first electronic device receives an operation that the user selects a target option from the plurality of options; the first electronic device receives an operation that the user determines to share the target device with the target user by using a use permission corresponding to the target option; and a second electronic device displays a third interface, where the third interface includes a first control corresponding to a function property that is of the target device and that the target user is allowed to use, and the first control is in an operable state.

Based on the method provided in this embodiment of this application, when the target device is to be shared with the target user, a use permission may be specified for the target user, and different use permissions allow the target user to use different function properties. In other words, users with different use permissions can use different functions of a smart household device (a smart door lock). In this way, security of sharing the device (the smart household device) is higher, and privacy protection is better.

In a possible implementation, that the first electronic device receives the operation of selecting the target user includes: The first electronic device displays a fourth interface, where the fourth interface includes one or more protocols used to share the target device; and the first electronic device receives an operation that the user selects a first protocol from the one or more protocols used to share the target device, and receives an operation that the user selects the target user by the user by using the first protocol; or the first electronic device displays a fifth interface, where the fifth interface includes one or more protocols used to share the target device and an option used to directly share the target device with one or more users; and the first electronic device receives an operation that the user selects the target user from the option used to directly share the target device with one or more users. In other words, the target user may be selected based on the protocol for sharing the target device, or the target user may be directly selected, which is more flexible and convenient.

In a possible implementation, after the first electronic device receives the operation that the user determines to share the target device with the target user by using the use permission corresponding to the target option, the method further includes: The first electronic device sends a device sharing request to a cloud server, where the device sharing request carries an identifier of the target user and a use permission of the target user; the cloud server receives the device sharing request, and matches the use permission of the target user with a function property label of the target device to obtain a first matching result, where the function property label is used to describe a type of a function property of the target device, and the matching result is used to indicate a function property that the target user is allowed to use and a function property that the target user is not allowed to use; the cloud server generates a first plug-in based on the first matching result, where the first plug-in includes the function property that the target user is allowed to use; the cloud server sends the first plug-in to the second electronic device; and the second electronic device receives and installs the first plug-in.

In this way, the use permission of the target user is matched with the function property label of the target device (for example, the smart door lock), and then the first plug-in is obtained based on the matching result. After installing the first plug-in, the target user can use the function property that the target user is allowed to use, and cannot use the function property that the target user is not allowed to use. In this way, security of sharing the device is higher, and privacy protection is better.

In a possible implementation, types of function properties are classified based on operation complexity, and a basic function, an advanced function, a super function, and the like may be included in descending order of operation complexity. For example, as shown in FIG. 14, function properties such as real-time checking, near-field door opening, and battery level checking may correspond to a basic function property, function properties such as remote door opening and fingerprint entering may correspond to an advanced function property, and functions such as password management, device adding, and checking a historical video of a camera may correspond to a super function property. Alternatively, types of function properties are classified based on security requirements, and a non-security function, a security function, a privacy function, and the like may be included in descending order of security requirements. A permission of a person to be shared with is: The person can directly use the non-security function, use the security function after entering a password, and cannot use the privacy function. The privacy function can be used only by a user who creates a home. Alternatively, types of function properties are classified based on roles of the function properties. For example, functions of the smart door lock may be classified into a control function and a management function. A permission of a person to be shared with may be: The person is allowed to use the control function. Alternatively, the permission of the person to be shared with may be: The person is allowed to use the management function. Alternatively, the permission of the person to be shared with may be: The person is allowed to use the management function and the control function. In other words, the types of the function properties may be classified from different dimensions, to meet different user requirements.

In a possible implementation, the function property includes at least one of the following fields: a property identifier ID, a data type, and an access manner, and the access manner includes at least one of reading, writing, listening, or setting to null. Descriptions of the function property may further include another field, for example, a field such as a description field (description) or a value range (valuerange). This is not limited in this application.

In a possible implementation, the method further includes: The first electronic device establishes a communication connection and binding to the target device. After the first electronic device establishes a binding relationship with the target device (pairing succeeds), the first electronic device may operate all functions of the target device. In addition, the first electronic device may share some or all functions of the target device with the second electronic device.

In a possible implementation, the method further includes: In response to an operation that the user opens a control interface of the target device, the first electronic device displays the control interface of the target device, where the control interface displayed on the first electronic device includes a second control corresponding to all function properties of the target device, and the second control is in an operable state. In other words, the first electronic device can operate all functions of the target device.

In a possible implementation, the use permission of the target user is set by the first electronic device by default. In other words, the use permission of the target user may also be set by default, and the user does not need to perform a manual operation.

In a possible implementation, the plurality of options respectively correspond to a first permission, a second permission, and a third permission, where the first permission is used to indicate that a first function property of the target device is allowed to be directly used, the second permission is used to indicate that a second function property of the target device is allowed to be directly used, the third permission is used to indicate that a third function property of the target device is allowed to be directly used, and the first function property, the second function property, and the third function property are not entirely the same. The first function property may be a basic function property of the target device, the second function property may be an advanced function property of the target device, and the third function property may be a super function property of the target device.

In a possible implementation, if the target device is a door lock device, the first function property includes at least one of real-time status checking, near-field door opening, or battery level checking, the second function property includes the first function property and at least one of remote door opening or biological information entering, and the third function property includes the second function property and at least one of password management or checking a historical video of a camera. For example, a basic user (for example, grandmother) can use basic functions such as real-time checking, near-field door opening, and battery level checking; an advanced user (for example, mother) can not only use the basic functions such as real-time checking, near-field door opening, and battery level checking, but can also use advanced functions such as remote door opening and fingerprint entering; and a super user (for example, father) can use the basic functions such as real-time checking, near-field door opening, and battery level checking, the advanced functions such as remote door opening and fingerprint entering, and super functions such as password management and device adding. In this way, security of sharing the smart household device is higher, and privacy protection is better.

In a possible implementation, the permission of the target user is a fourth permission, the fourth permission is used to indicate that a fourth function property of the target device is allowed to be directly used, and that a fifth function property of the target device is allowed to be used after a preset password is entered, and the fourth function property is different from the fifth function property. The fourth function property may be the non-security function of the target device, and the target user can directly use the non-security function. The fifth function property may be the security function of the target device, and the target user can use the security function after entering a password.

In a possible implementation, the method further includes: The cloud server receives a device profile of the target device from the target device or the first electronic device, where the device profile includes a plurality of function properties of the target device, and each of the plurality of function properties corresponds to one function property label.

In a possible implementation, the first plug-in includes all function properties of the target device, and in all the function properties, the function property that the target user is allowed to use is readable and writable, and the function property that the target user is not allowed to use is unreadable and unwritable; or the first plug-in includes only the function property that the target user is allowed to use in all function properties of the target device, and the function property that the target user is allowed to use is readable and writable. In this way, after the first plug-in is installed on the second electronic device, only a function property that is of the target device and that the target user is allowed to use can be operated. Therefore, security of sharing the device is higher, and privacy protection is better.

In a possible implementation, that the second electronic device displays the third interface includes: The second electronic device displays the first control, where the first control is in an operable state; or the second electronic device displays a second control corresponding to all the function properties of the target device, where the second control includes the first control and a third control corresponding to the function property that the target user is not allowed to use, the first control is in an operable state, and the third control is set to gray. For example, as shown in FIG. 10A, the second electronic device (for example, a mobile phone B or a mobile phone C) may display a function interface 360 (the third interface) of the target device (for example, the smart door lock), and the interface 360 includes an icon 361 of the smart door lock, a status (for example, locked) 362 of the smart door lock, and a function control area 363. The function control area 363 may include a near-field door opening button, a remote door locking button, and a real-time checking button (that is, the first control, where the first control may include one or more controls). In other words, a function interface of the smart door lock different from that of the mobile phone A may be presented. Alternatively, as shown in FIG. 10B, a mobile phone B or a mobile phone C may display a function interface 370 of the smart door lock, and the interface 370 includes an icon 371 of the smart door lock, a status (for example, locked) 372 of the smart door lock, and a function control area 373. The function control area 373 may include a near-field door opening button, a remote door locking button, a real-time checking button, a remote door opening button, a fingerprint entering button, and a password management button (that is, the second control, where the second control may include the first control and the third control). The near-field door opening button, the remote door locking button, and the real-time checking button are available (the near-field door opening button, the remote door locking button, and the real-time checking button are first controls), and buttons such as the remote door opening button, the fingerprint entering button, and the password management button are set to gray (the remote door opening button, the fingerprint entering button, and the password management button are third controls), that is, are unavailable.

According to a second aspect, an embodiment of this application provides a method for sharing a home, and the method includes: A first electronic device displays a sixth interface, where the sixth interface includes a fourth control and N to-be-shared homes, N is an integer greater than or equal to 1, and the fourth control is used to indicate that the sixth interface is an interface for sharing a home; the first electronic device receives an operation that a user selects a target home from one or more to-be-shared homes; the first electronic device receives an operation that the user selects a target user; the first electronic device displays a seventh interface, where the seventh interface includes a plurality of options, different options in the plurality of options correspond to different use permissions, and different use permissions allow the target user to use different function properties; the first electronic device receives an operation that the user selects a target option from the plurality of options; the first electronic device receives an operation that the user determines to share the target home with the target user by using a use permission corresponding to the target option; and a second electronic device displays an eighth interface, where the eighth interface is a control interface of a first device in the target home, the first device is any device in the target home, the eighth interface includes a fourth control corresponding to a function property that is of the first device and that the target user is allowed to use, and the fourth control is in an operable state.

Based on the method provided in this embodiment of this application, when the target home is to be shared with the target user, a use permission may be specified for the target user, and different use permissions allow the target user to use different function properties of a device in the target home. In other words, users with different use permissions can use different functions of the device (for example, a smart door lock) in the target home. In this way, security of sharing the device (a smart household device) is higher, and privacy protection is better.

In a possible implementation, that the first electronic device receives the operation of selecting the target user includes: The first electronic device displays a ninth interface, where the ninth interface includes one or more protocols used to share the target home; and the first electronic device receives an operation that the user selects a first protocol from the one or more protocols used to share the target home, and receives an operation that the user selects the target user by using the first protocol; or the first electronic device displays a tenth interface, where the tenth interface includes one or more protocols used to share the target home and an option used to directly share the target home with one or more users; and the first electronic device receives an operation that the user selects the target user from the option used to directly share the target home with one or more users.

In a possible implementation, the method further includes: The first electronic device sends a home sharing request to a cloud server, where the home sharing request carries an identifier of the target user and a use permission of the target user; the cloud server receives the home sharing request, and matches the use permission of the target user with function property labels of all devices in the target home to obtain a second matching result, where the function property labels are used to describe types of function properties of the devices, and the second matching result is used to indicate a function property that is of each of all the devices and that the target user is allowed to use and a function property that the target user is not allowed to use; the cloud server generates a second plug-in based on the second matching result, where the second plug-in includes the function property that is of each of all the devices and that the target user is allowed to use; the cloud server sends the second plug-in to the second electronic device; the second electronic device receives and installs the second plug-in; and the second electronic device displays a control interface of the first device in all the devices, where the control interface of the first device includes a fourth control corresponding to a function property that is of the first device and that the target user is allowed to use, and the fourth control is in an operable state.

In a possible implementation, the types of the function properties are classified based on operation complexity; or the types of the function properties are classified based on security requirements; or the types of the function properties are classified based on roles of the function properties.

In a possible implementation, the function property includes at least one of the following fields: a property identifier ID, a data type, and an access manner, and the access manner includes at least one of reading, writing, listening, or setting to null.

In a possible implementation, the plurality of options respectively correspond to a first permission, a second permission, and a third permission, where the first permission is used to indicate that first function properties of all the devices in the target home are allowed to be directly used, the second permission is used to indicate that second function properties of all the devices in the target home are allowed to be directly used, the third permission is used to indicate that third function properties of all the devices in the target home are allowed to be directly used, and the first function properties, the second function properties, and the third function properties are different.

In a possible implementation, if the target home includes a door lock device, a first function property corresponding to the door lock device includes at least one of real-time status checking, near-field door opening, or battery level checking, a second function property corresponding to the door lock device includes the first function property corresponding to the door lock device and at least one of remote door opening or biological information entering, and a third function property corresponding to the door lock device includes the second function property corresponding to the door lock device and at least one of password management or checking a historical video of a camera.

In a possible implementation, the second plug-in includes all function properties of all the devices in the target home, and in all the function properties, the function property that the target user is allowed to use is readable and writable, and the function property that the target user is not allowed to use is unreadable and unwritable; or the second plug-in includes only the function property that the target user is allowed to use in all function properties of all the devices in the target home, and the function property that the target user is allowed to use is readable and writable.

In a possible implementation, that the second electronic device displays the eighth interface includes: The second electronic device displays a fourth control, where the fourth control is in an operable state; or the second electronic device displays a fifth control corresponding to all function properties of the first device, where the fifth control includes the fourth control and a sixth control corresponding to the function property that the target user is not allowed to use, the fourth control is in an operable state, and the sixth control is set to gray.

According to a third aspect, this application provides a chip system, and the chip system includes one or more interface circuits and one or more processors. The interface circuit and the processor are interconnected by using a line.

The chip system may be applied to a first electronic device, a second electronic device, or a cloud server that includes a communication module and a memory. The interface circuit is configured to: receive a signal from the memory of the first electronic device, the second electronic device, or the cloud server, and send the received signal to the processor, where the signal includes computer instructions stored in the memory. When the processor executes the computer instructions, the first electronic device, the second electronic device, or the cloud server may perform the method in the first aspect, the second aspect, or any one of the possible design manners thereof.

According to a fourth aspect, this application provides a computer-readable storage medium, and the computer-readable storage medium includes computer instructions. When the computer instructions are run on a first electronic device, a second electronic device, or a cloud server (for example, a mobile phone), the first electronic device, the second electronic device, or the cloud server is enabled to perform the method in the first aspect, the second aspect, or any one of the possible design manners thereof.

According to a fifth aspect, this application provides a computer program product, and when the computer program product runs on a computer, the computer is enabled to perform the method in the first aspect, the second aspect, or any one of the possible design manners thereof.

According to a sixth aspect, this application provides an apparatus for sharing a device. The apparatus includes a processor, the processor is coupled to a memory, the memory stores program instructions, and when the program instructions stored in the memory are executed by the processor, the apparatus is enabled to implement the method in the first aspect, the second aspect, or any one of the possible design manners thereof. The apparatus may be a first electronic device, a second electronic device, or a cloud server; or may be a constituent part of the first electronic device, the second electronic device, or the cloud server, for example, a chip.

According to a seventh aspect, this application provides an apparatus for sharing a device. The apparatus may be divided into different logical units or modules based on functions, and the units or modules perform different functions, so that the apparatus performs the method in the first aspect, the second aspect, or any one of the possible design manners thereof.

According to an eighth aspect, this application provides a system for sharing a device. The system includes a first electronic device, a second electronic device, and a cloud server, and the first electronic device, the second electronic device, and the cloud server each perform some steps and cooperate with each other to implement the method in the first aspect, the second aspect, or any one of the possible design manners thereof.

It may be understood that for beneficial effects of the chip system in the third aspect, the computer-readable storage medium in the fourth aspect, the computer program product in the fifth aspect, the apparatuses in the sixth aspect and the seventh aspect, and the system in the eighth aspect, refer to beneficial effects in the first aspect, the second aspect, or any one of the possible design manners thereof. Details are not described herein again.

DESCRIPTION OF EMBODIMENTS

The following describes technical solutions in embodiments of this application with reference to accompanying drawings in embodiments of this application. In the description of this application, unless otherwise specified, "at least one" means one or more, and "a plurality of" means two or more. In addition, for ease of clearly describing the technical solutions in the embodiments of this application, in the embodiments of this application, words such as "first" and "second" are used to distinguish same items or similar items whose functions and roles are basically the same. A person skilled in the art may understand that the words such as "first" and "second" do not limit a quantity and an execution sequence, and the words such as "first" and "second" do not indicate a definite difference.

Currently, a smart household APP supports sharing of a smart device between family members. For example, a user A may share a device 1 with a user B, so that the user B can operate all functions of the device 1.

However, for some devices requiring high security, once the user B incorrectly operates the devices, great impact may be caused to family security. For example, if a door opening function of a door lock is incorrectly operated, there is a great risk to both safety of family property and personal safety.

For the foregoing problem, this application provides a method for sharing a function of a smart device. When sharing a smart household device at home, a user may grant different function use permissions to different family members. For example, when a user A shares a device 1 with a user B, if the user B is a young person (father or mother), the user B is allowed to use all functions of the device 1; and if the user B is an elder (grandfather or grandmother) or a youngster (child), the user B is allowed to use a basic function. In this way, a security risk can be better eliminated.

Figure 1:
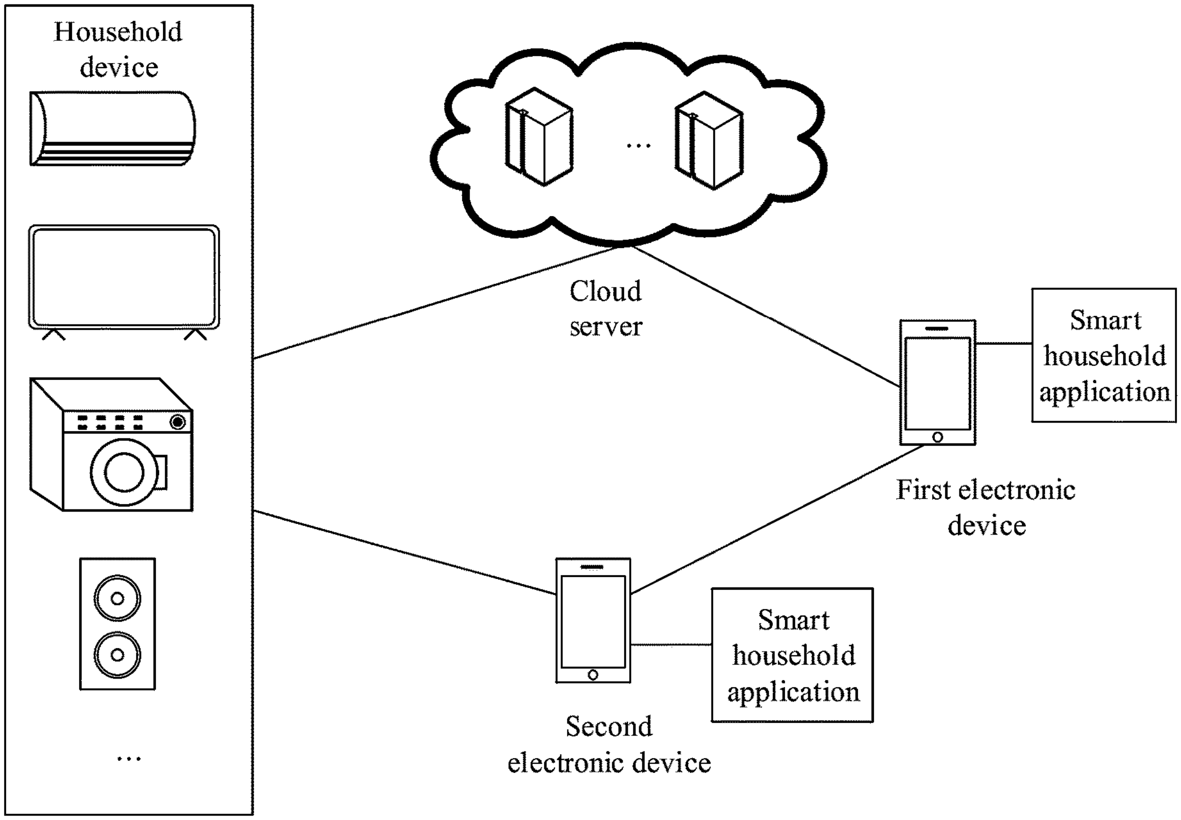
FIG. 1 is a schematic diagram of a system architecture according to an embodiment of this application.

FIG. 1 is a schematic diagram of a system according to an embodiment of this application. The system may include a household device, a cloud server, a first electronic device, and a second electronic device. The first electronic device, the second electronic device, and the household device may access a WIFI network (for example, access a router), and the router may communicate with the cloud server by using a wired network (for example, an Ethernet). In addition, the first electronic device and the second electronic device may also communicate with the cloud server by using a 2G/3G/4G/5G network. A smart household application (application, APP) may be installed on the first electronic device and the second electronic device. The first electronic device and the second electronic device may control the household device by using a cloud server corresponding to the smart household APP. The first electronic device and the second electronic device have different permissions for controlling the household device, so that a function that is of the household device and that can be controlled by the first electronic device is different from a function that is of the household device and that can be controlled by the second electronic device.

Figure 2:
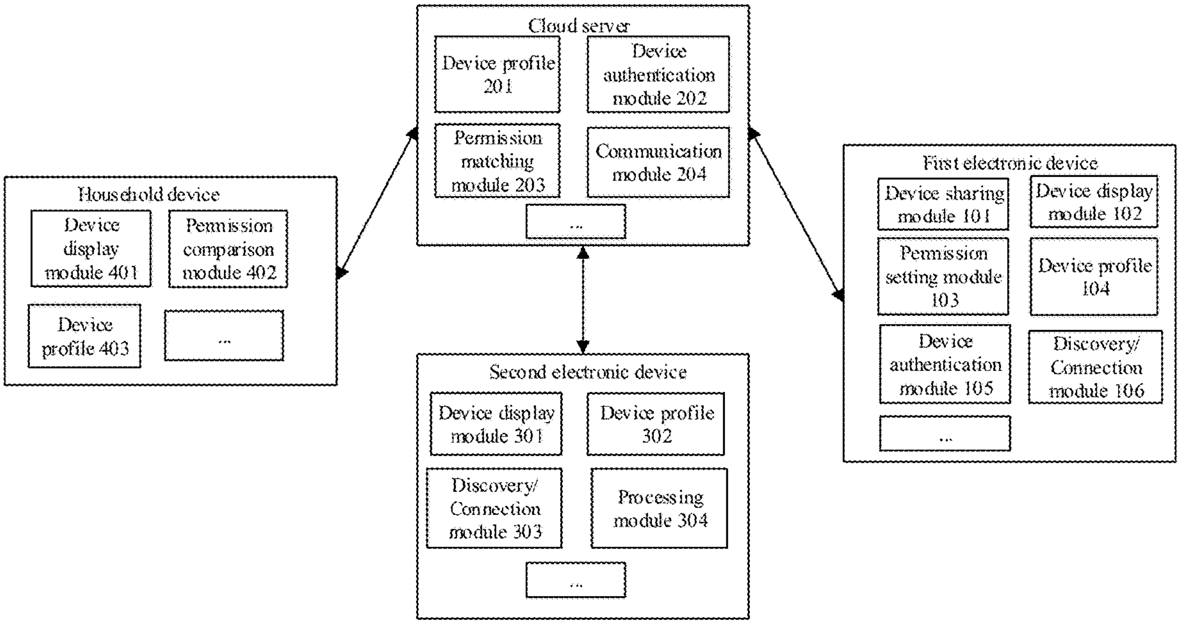
FIG. 2 is a schematic diagram of modules of a device according to an embodiment of this application.

As shown in FIG. 2, the first electronic device may include a device sharing module 101, a device display module 102, a permission setting module 103, a device profile 104, a device authentication module 105, a discovery/connection module 106, and the like.

The device sharing module 101 is configured to share a specific smart device (for example, a smart door lock) at home or share a home (that is, all smart devices at home) with another family member by using a smart household APP (for example, Honor Home).

The device display module 102 is configured to display a function on the smart household APP based on the device profile.

The permission setting module 103 is configured to set a permission corresponding to a user.

The device profile (DeviceProfile) 104 is configured to describe information such as a function property (property) of a device and a service opened to the outside. The service is an independent and meaningful function group, and the function group may be reused between different types of terminal devices. The function property is a minimum unit used to describe a status and a function of the terminal device, and is also a basic composition unit of the service. Descriptions of the function property may include fields such as a property identifier (identity, ID), a data type (type), and an access manner (access). The access manner of the function property includes read (that is, readable, where a device can read the property), write (that is, writable, where a device can modify the property), listen (that is, reportable, where a device can report the property), set to null (that is, unreadable and unwritable), and the like. Certainly, the descriptions of the function property may further include another field, for example, a field such as a description field or a value range. This is not limited in this application.

For example, a device profile of the mart door lock may be shown as follows:

```
{
"Title": "Smart Door Lock",
  "Description": "smart door lock",
  "ServiceList": {
    "Door opening service": {
      "ServiceID": "15e799303d5b4a5a87398f83d70603da",
      "Title": "Door Opening Service",
      "Description": "door opening service",
      "propertyList": {
        "Open the door via Bluetooth": {
          "PropertyID": "boneVoiceprint",
          "Access": 5,
          "Type": "int",
          "description": "Open/Close via Bluetooth, 0: Close, 1: Open",
          "defaultValue": 0,
          "items": { }
        },
        "Open the door via WIFI": {
          "PropertyID": "property",
          "Access": 5,
          "Type": "int",
          "description": "Open/Close via WIFI, 0: Close, 1: Open",
          "defaultValue": 0,
```

-continued

```
        "items": { }
      }
    }
  }
```

The device authentication module 105 is a functional module that performs authentication between the device, an account cloud server, and a service cloud server of the household device when the first electronic device establishes an association relationship with the household device.

The discovery/connection module 106 is a functional module that is used by the smart household APP to discover the household device via wife or Bluetooth and bind the household device to an account.

The cloud server may include a device profile 201, a device authentication module 202, a permission matching module 203, a communication module 204, and the like. For the device profile 201, refer to related descriptions of the device profile 104. The device profile 201 stored in the cloud server may be sent by the first electronic device or the household device to the cloud server. The device authentication module 202 is a functional module used by the cloud server to perform authentication on the first electronic device or the second electronic device. The permission matching module 203 is configured to match a permission of a user with a function property label of the household device (for specific descriptions, refer to step 1303). The communication module 204 is configured to communicate with the first electronic device, the second electronic device, or the household device.

The second electronic device may include a device display module 301, a device profile 302, a discovery/connection module 303, a processing module 304, and the like. For the device display module 301, refer to related descriptions of the device display module 102. For the discovery/connection module 303, refer to related descriptions of the discovery/connection module 106. The device profile 302 may be delivered by the cloud server to the second electronic device. The processing module 304 may be configured to install a plug-in. The plug-in may be a program written for a specific application (for example, a smart household APP), and may be configured to add a function of the specific application.

The household device may include a device display module 401, a permission comparison module 402, a device profile 403, and the like. The device display module 401 is configured to display a function. The permission comparison module 402 is configured to compare permissions of different users. Therefore, the household device may allow, based on permissions of different users, the different users to use different functions. For the device profile 403, refer to related descriptions of the device profile 104. The device profile 404 may be disposed in the household device before delivery from factory.

For example, the first electronic device or the second electronic device in this embodiment of this application may be a device on which the smart household application can be installed, such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)\virtual reality (virtual reality, VR) device. A specific form of the electronic device is not specifically limited in this embodiment of this application.

The household device provided in this embodiment of this application may be a device that can access a home wireless local area network, such as a large screen (a smart screen or a television set), a speaker (sound box), a camera, an air conditioner, a refrigerator, a smart curtain, a table lamp, a ceiling lamp, an electric rice cooker, a security protection device (such as a smart door lock), or a personal computer (personal computer, PC). The household device may alternatively be an IOT device, such as a smartwatch, a smart band, smart glasses, or a tablet computer. The household device may alternatively be a vehicle-mounted speaker, a vehicle-mounted air conditioner, or the like. A specific form of the household device is not specifically limited in this embodiment of this application. The household device may include a wireless fidelity (wireless fidelity, WIFI) module, to connect to the home local area network.

The method provided in the embodiments of this application may be applied to the field of smart household. The field of smart household may include scenarios such as home security protection, indoor monitoring, and family care.

Figure 3:
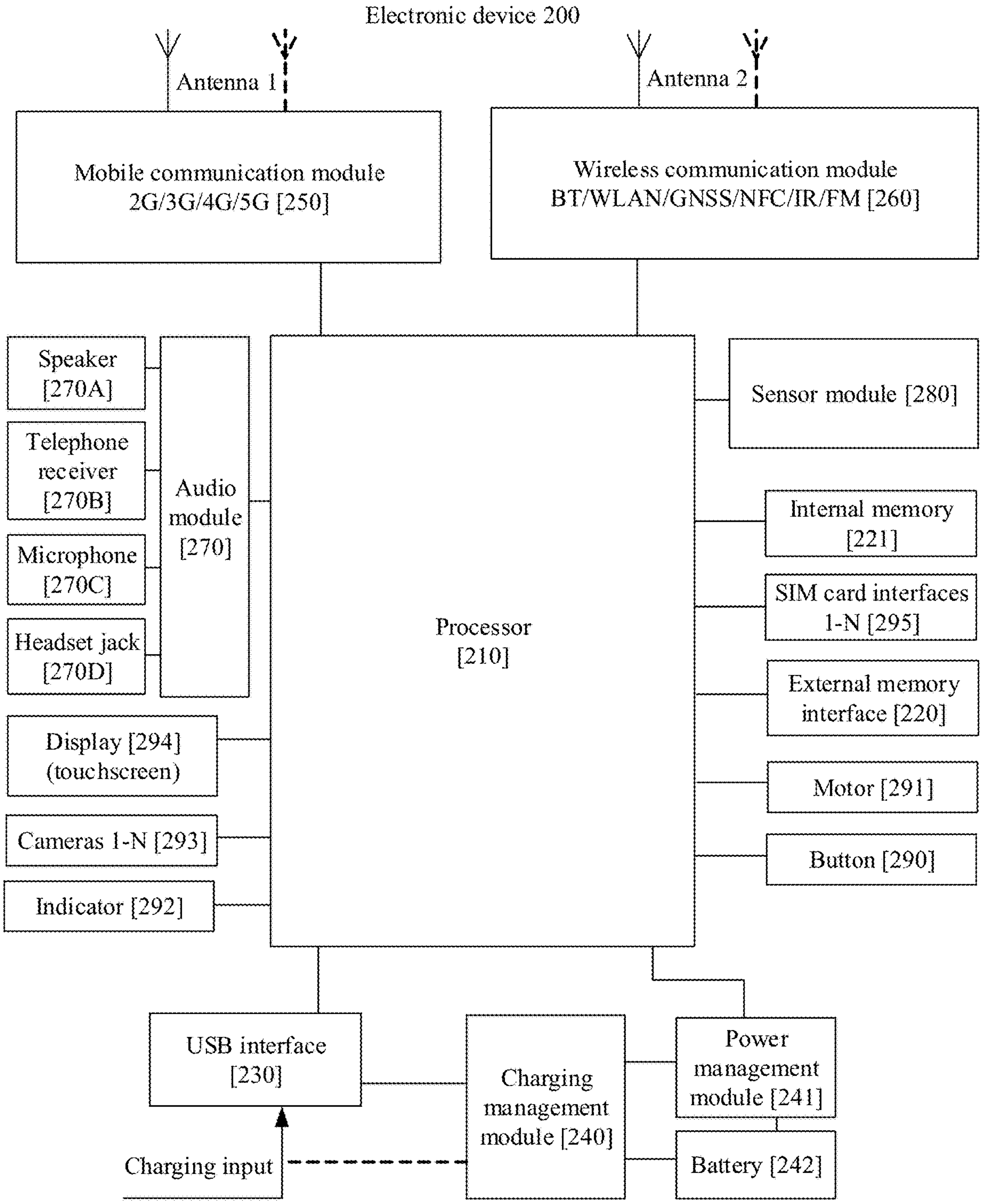
FIG. 3 is a schematic diagram of a structure of an electronic device according to an embodiment of this application.

In this embodiment of this application, that the first electronic device and the second electronic device are electronic devices 200 (for example, mobile phones) is used as an example to describe structures of the first electronic device and the second electronic device provided in the embodiments of this application. As shown in FIG. 3, the electronic device 200 (for example, a mobile phone) may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a telephone receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like.

The sensor module 280 may include sensors such as a pressure sensor, a gyroscope sensor, an atmospheric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that a structure illustrated in this embodiment does not constitute a specific limitation on the electronic device 200. In some other embodiments, the electronic device 200 may include more or fewer components than those shown in the figure, or some components are combined, or some components are split, or component arrangements are different. Components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components or may be integrated into one or more processors.

A wireless communication function of the electronic device 200 may be implemented by using the antenna 1, the antenna 2, the mobile communication module 250, the wireless communication module 260, the modem processor, the baseband processor, and the like. In some embodiments, the antenna 1 of the electronic device 200 is coupled to the mobile communication module 250, and the antenna 2 is coupled to the wireless communication module 260, so that the electronic device 200 can communicate with a network and another device by using a wireless communication technology.

The antenna 1 and the antenna 2 are configured to transmit and receive electromagnetic wave signals. Each antenna of the electronic device 200 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 250 can provide a wireless communication solution that is applied to the electronic device 200, including 2G/3G/4G/5G and the like. The mobile communication module 250 may include at least one filter, at least one switch, at least one power amplifier, at least one low noise amplifier (low noise amplifier, LNA), and the like. The mobile communication module 250 may receive an electromagnetic wave by using the antenna 1, perform processing such as filtering and amplification on the received electromagnetic wave, and then transmit the electromagnetic wave to the modem processor for demodulation. For example, in a possible implementation of this embodiment of this application, the first electronic device or the second electronic device may communicate with a cloud server by using the mobile communication module 250.

The mobile communication module 250 may further amplify a signal modulated by the modem processor, and convert the signal into an electromagnetic wave by using the antenna 1 for radiation. In some embodiments, at least some functional modules of the mobile communication module 250 may be disposed in the processor 210. In some embodiments, at least some functional modules of the mobile communication module 250 and at least some modules of the processor 210 may be disposed in a same component.

The wireless communication module 260 may provide a wireless communication solution that is applied to the electronic device 200, including a WLAN (for example, a (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. For example, in a possible implementation of this embodiment of this application, the first electronic device and the second electronic device may access, by using the wireless communication module 260, a temporary network (for example, a Wi-Fi network) provided by a router.

The wireless communication module 260 may be one or more components integrated with at least one communication processing module. The wireless communication module 260 receives an electromagnetic wave by using the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation by using the antenna 2.

The electronic device 200 implements a display function by using a GPU, the display 294, an application processor, and the like. The GPU is a microprocessor for image processing, and connects the display 294 and the application processor. The GPU is configured to perform mathematical and geometric calculation, and is configured to render graphics. The processor 210 may include one or more GPUs that execute program instructions to generate or change displayed information.

The display 294 is configured to display an image, a video, and the like. The display 294 includes a display panel. For example, in this embodiment of this application, the display 294 may be configured to display an application interface of the foregoing first APP, such as a device sharing interface, a device searching interface, and a two-dimensional code scanning interface.

In this embodiment of this application, the display 294 may be configured to display a display interface shown in FIG. 4A and FIG. 4B-FIG. 12A, FIG. 12B, FIG. 12C, and FIG. 12D.

For ease of understanding, a process in which a user (for example, YOYO) of a mobile phone A (a first electronic device) shares a device (for example, a smart door lock) or shares a home (for example, YOYO's home) with another user is used as an example below to describe a UI interface related to the method provided in the embodiments of this application.

Figure 4A:
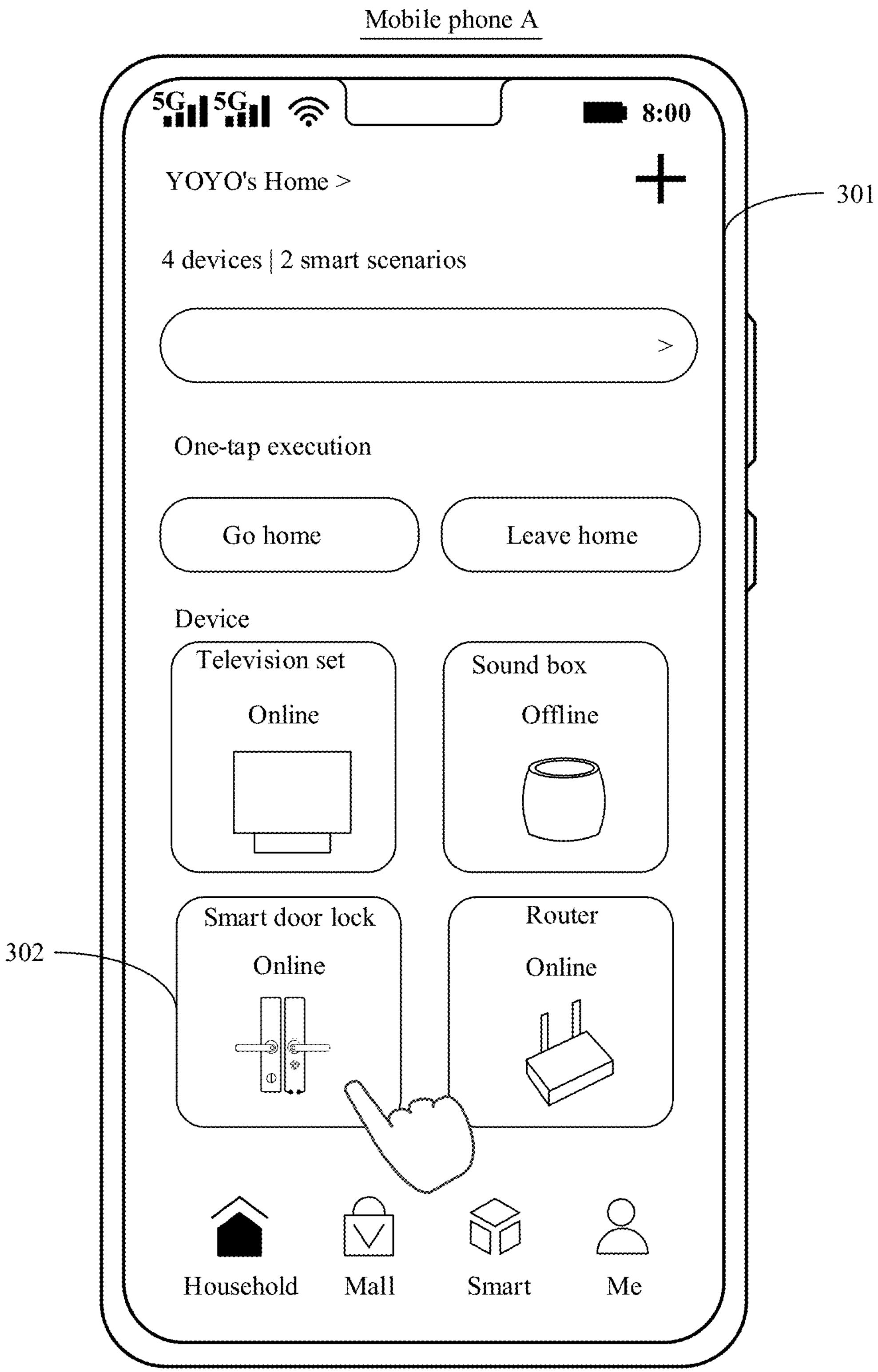
FIG. 4A and FIG. 4B are a schematic diagram of display according to an embodiment of this application.
Figure 4B:
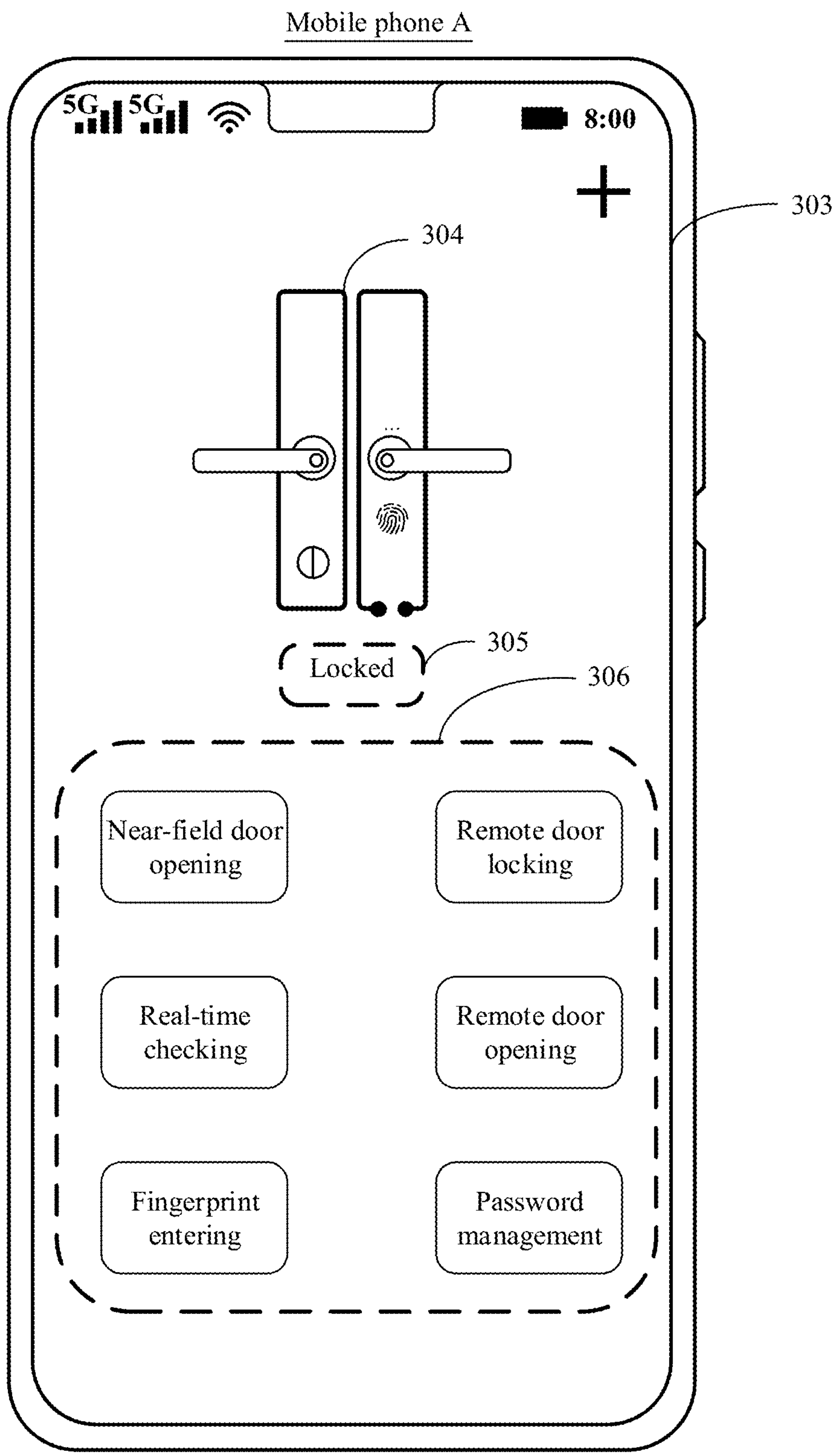

After the mobile phone A is bound to the smart door lock (a target device), as shown in FIG. 4A, in response to an operation that the user selects a smart door lock 302 on a home page 301 of a smart household APP (for example, Honor Home), as shown in FIG. 4B, the mobile phone A may display a control interface 303 of the smart door lock, and the interface 303 of the smart door lock may include an icon 304 of the smart door lock, a status (locked) 305 of the smart door lock, and a function control area 306 of the smart door lock. The function control area 306 of the smart door lock may include all function control buttons of the smart door lock. For example, the function control area 306 may include buttons such as near-field door opening (for example, face recognition door opening, password door opening, fingerprint door opening, Bluetooth door opening, or two-dimensional code door opening), remote door locking, real-time checking (which may also be referred to as real-time status checking, that is, checking a status of a door lock, where the status of the door lock includes a locked state and an opened state), remote door opening, biological information entering (fingerprint, facial information, pupil information, and the like), and password management.

Figure 5A:
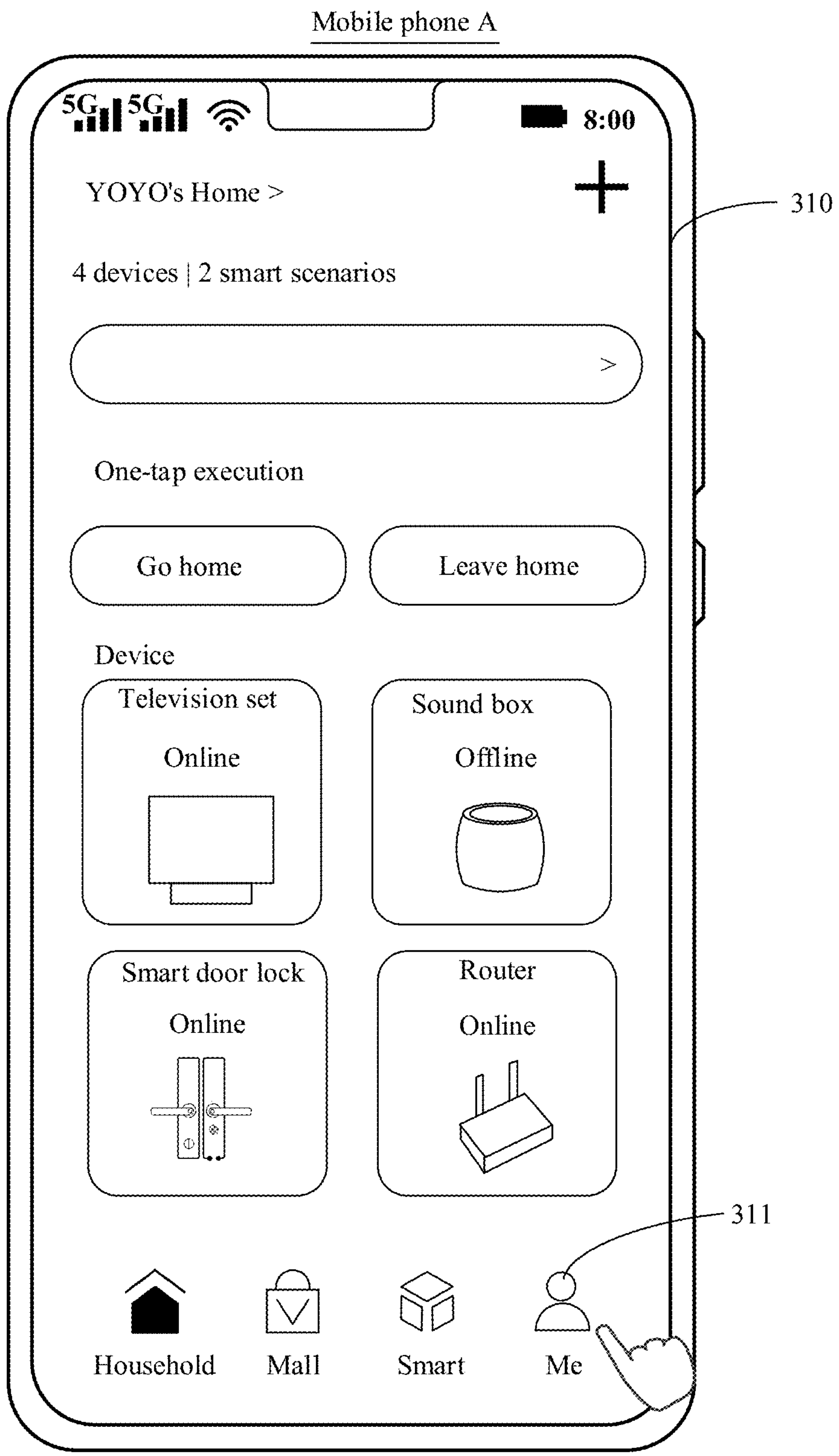
FIG. 5A, FIG. 5B, and FIG. 5C are another schematic diagram of display according to an embodiment of this application.
Figure 5B:
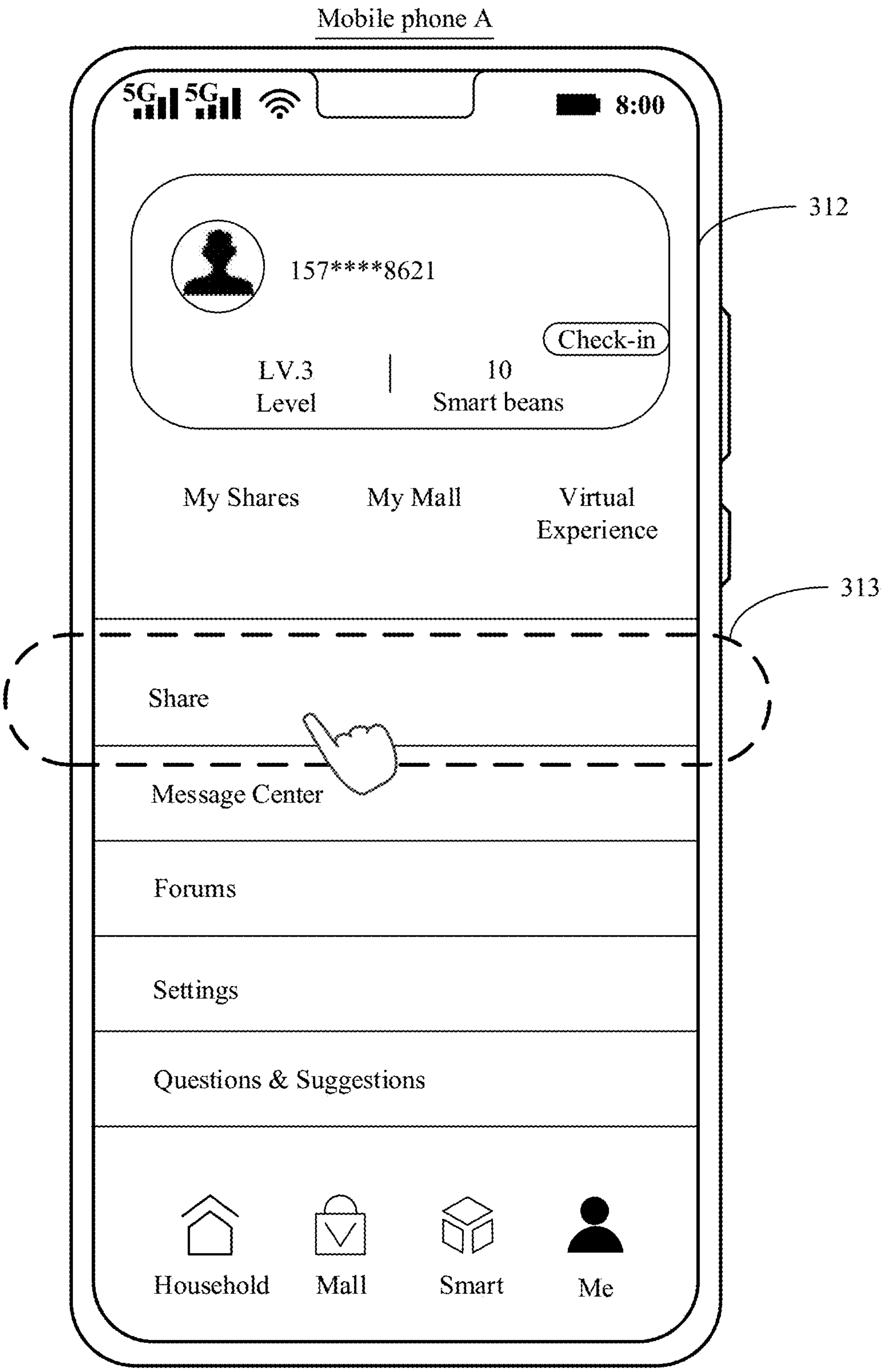
Figure 5C:
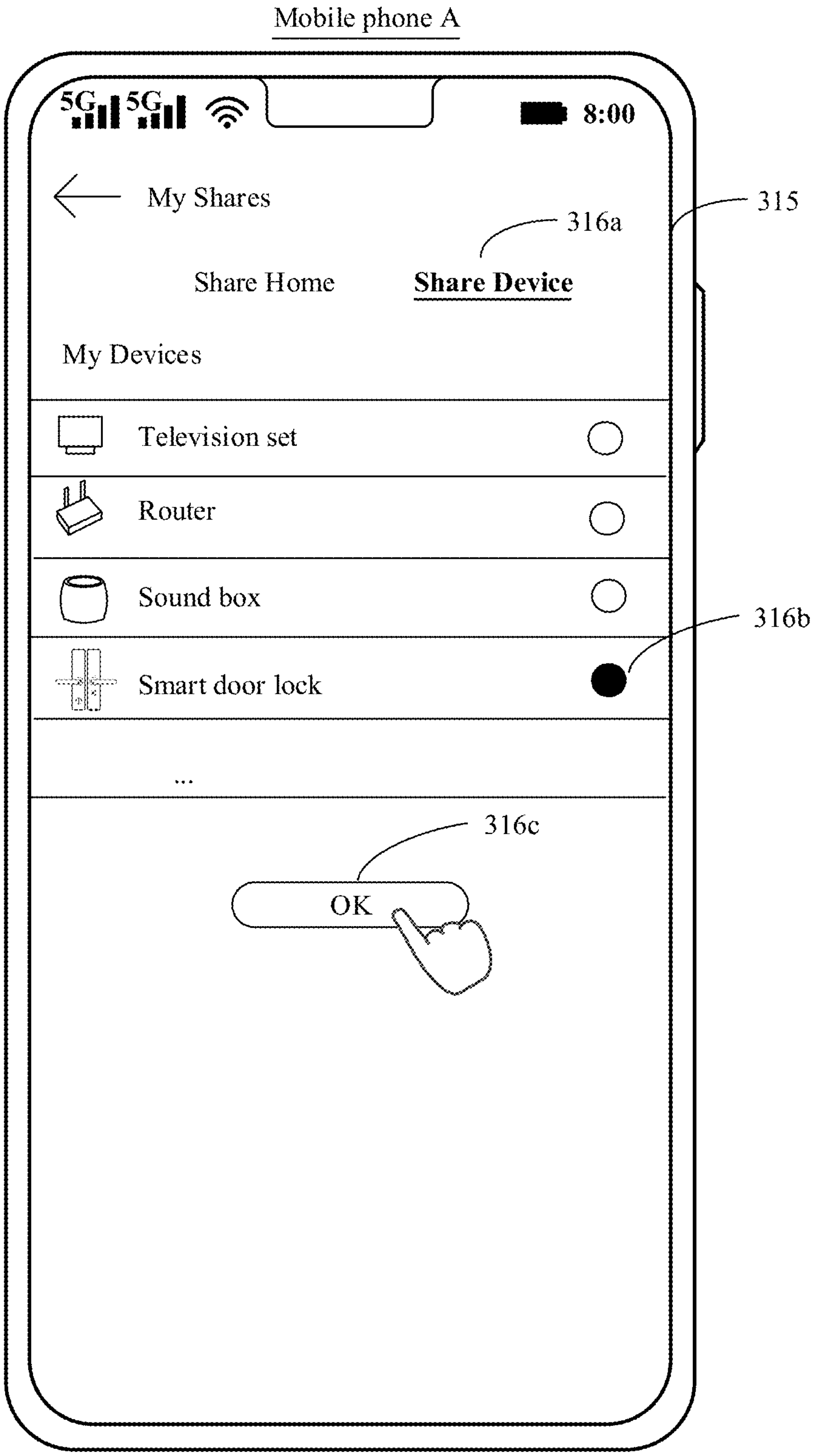
Figure 6A:
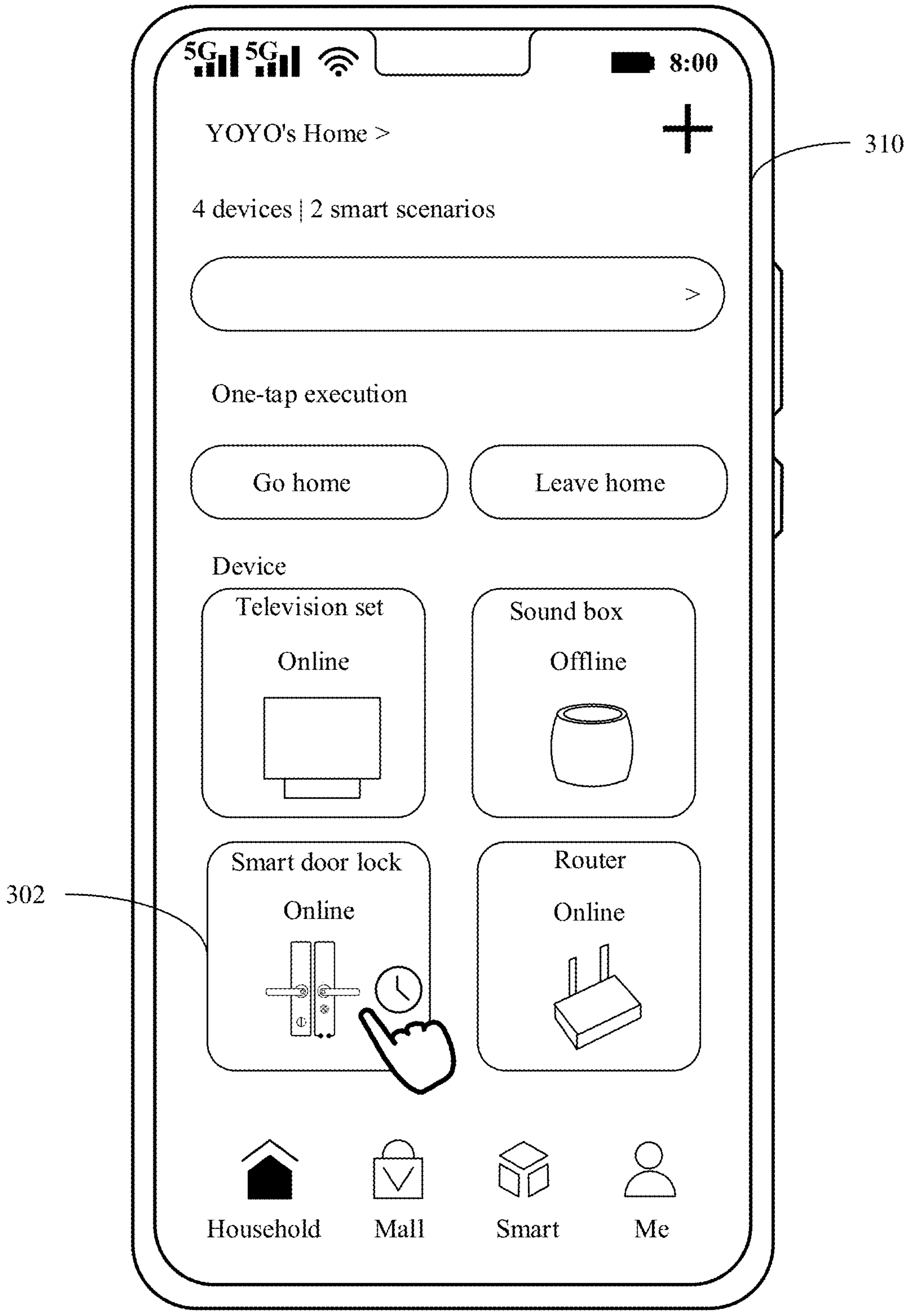
FIG. 6A and FIG. 6B are another schematic diagram of display according to an embodiment of this application.
Figure 6B:
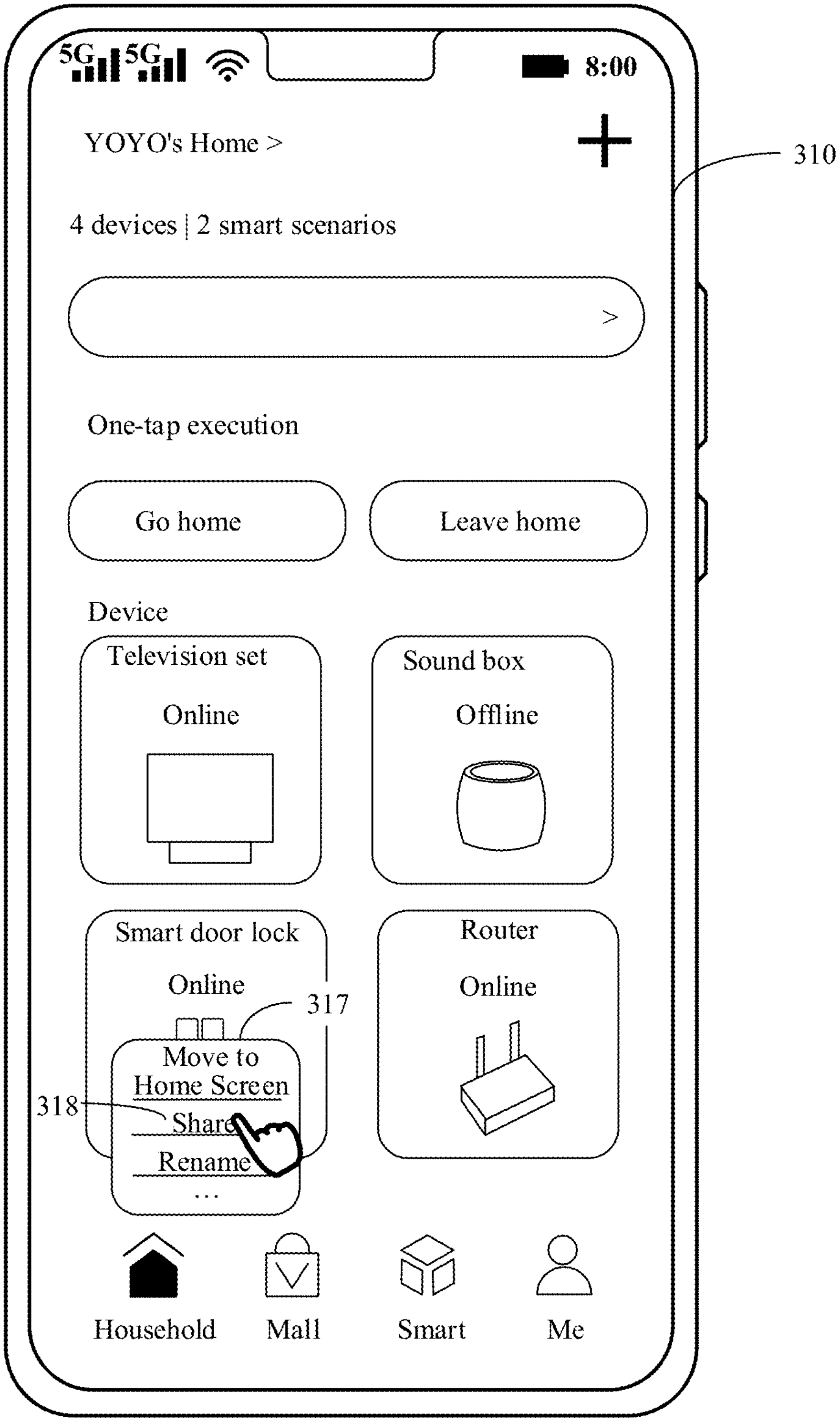
Figure 7A:
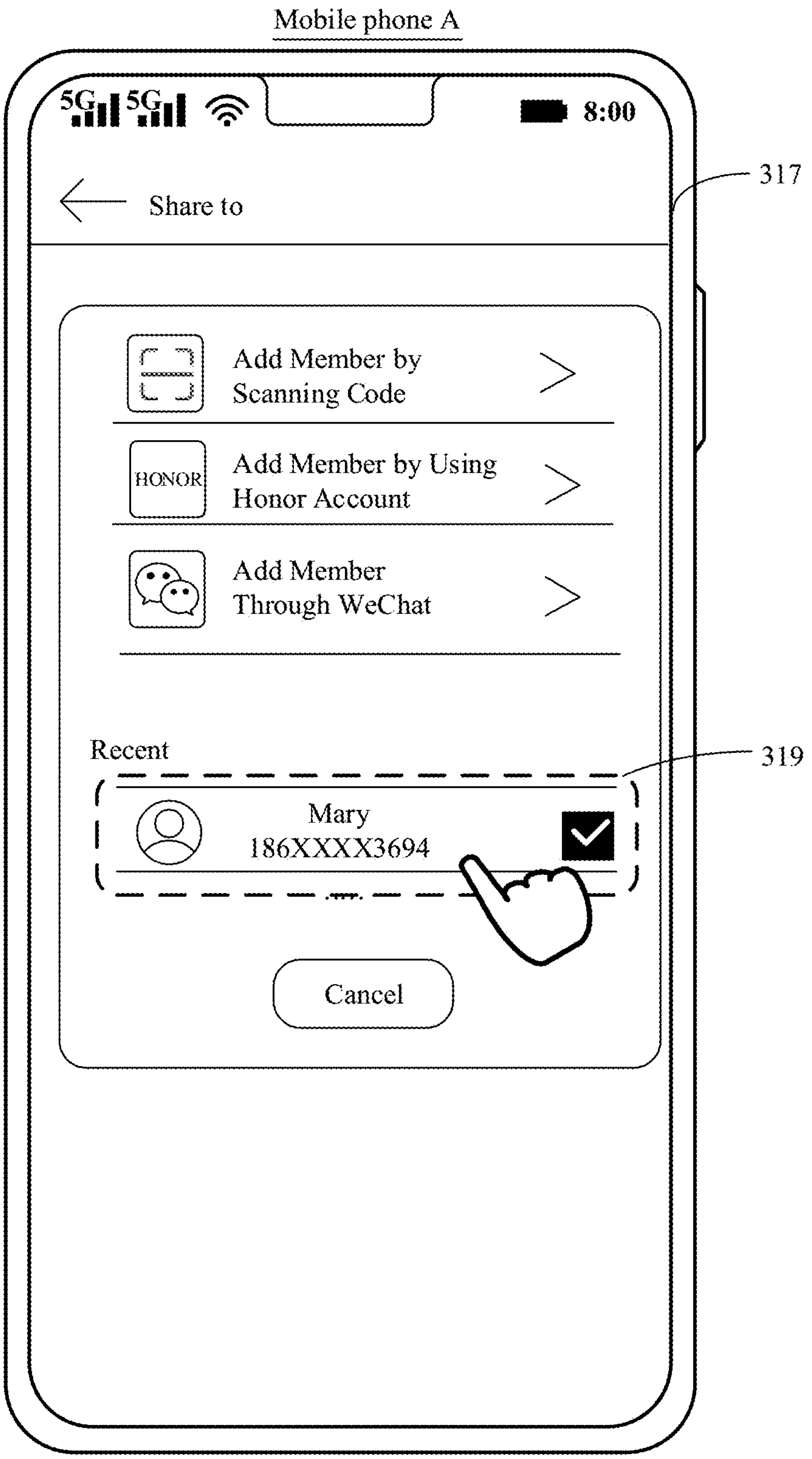
FIG. 7A, FIG. 7B, FIG. 7C, and FIG. 7D are another schematic diagram of display according to an embodiment of this application.
Figure 7B:
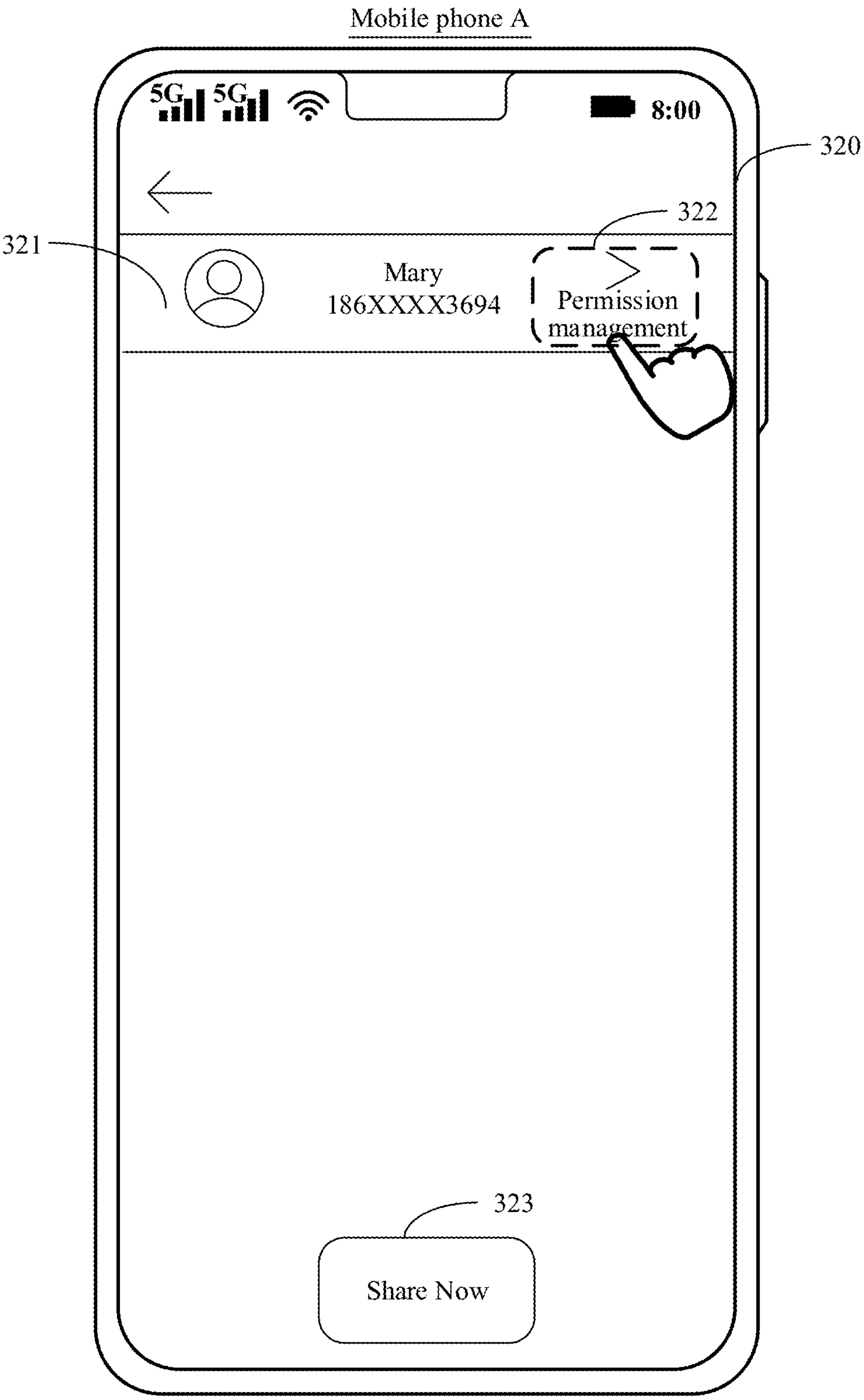
Figure 7C:
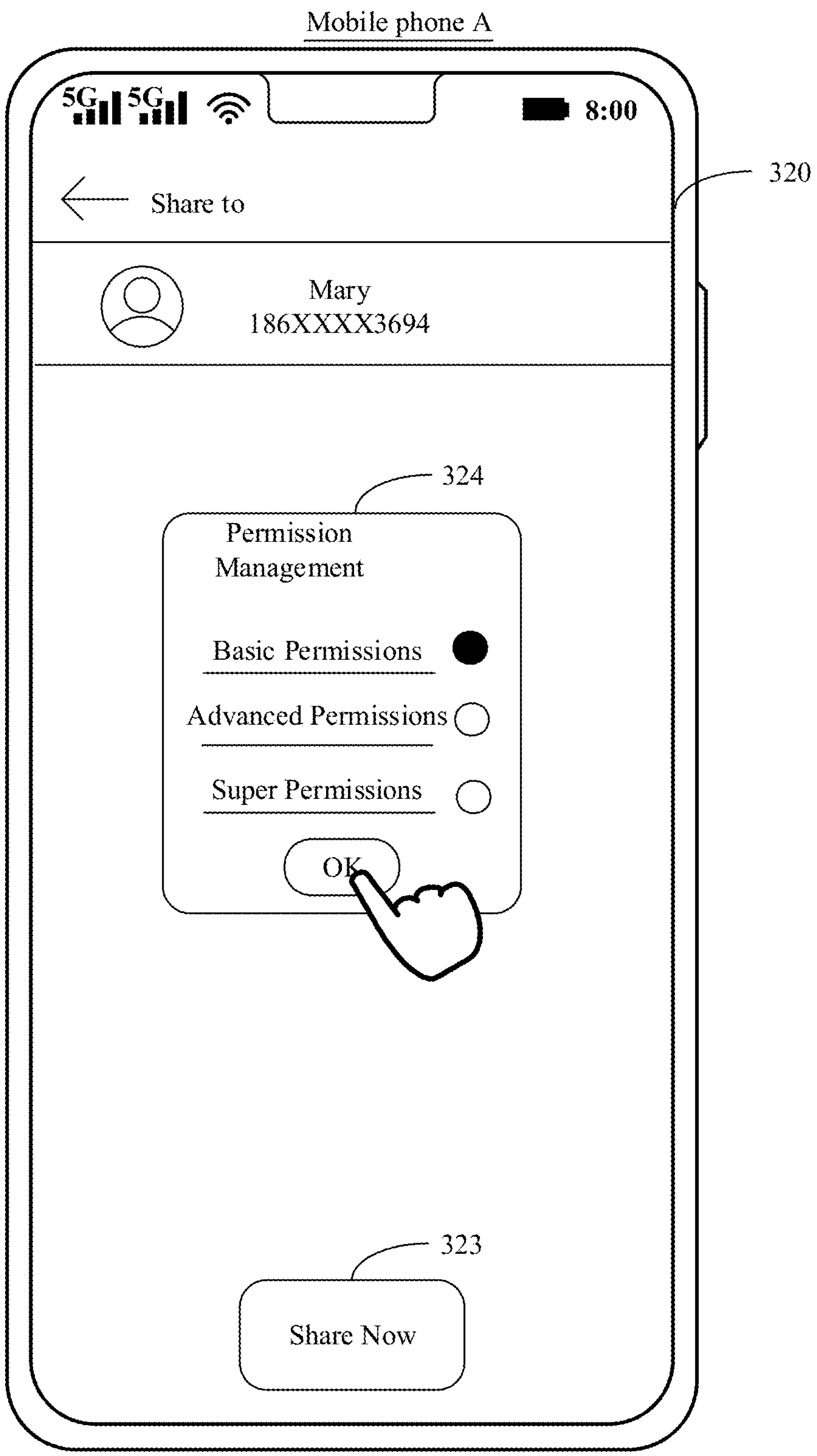
Figure 7D:
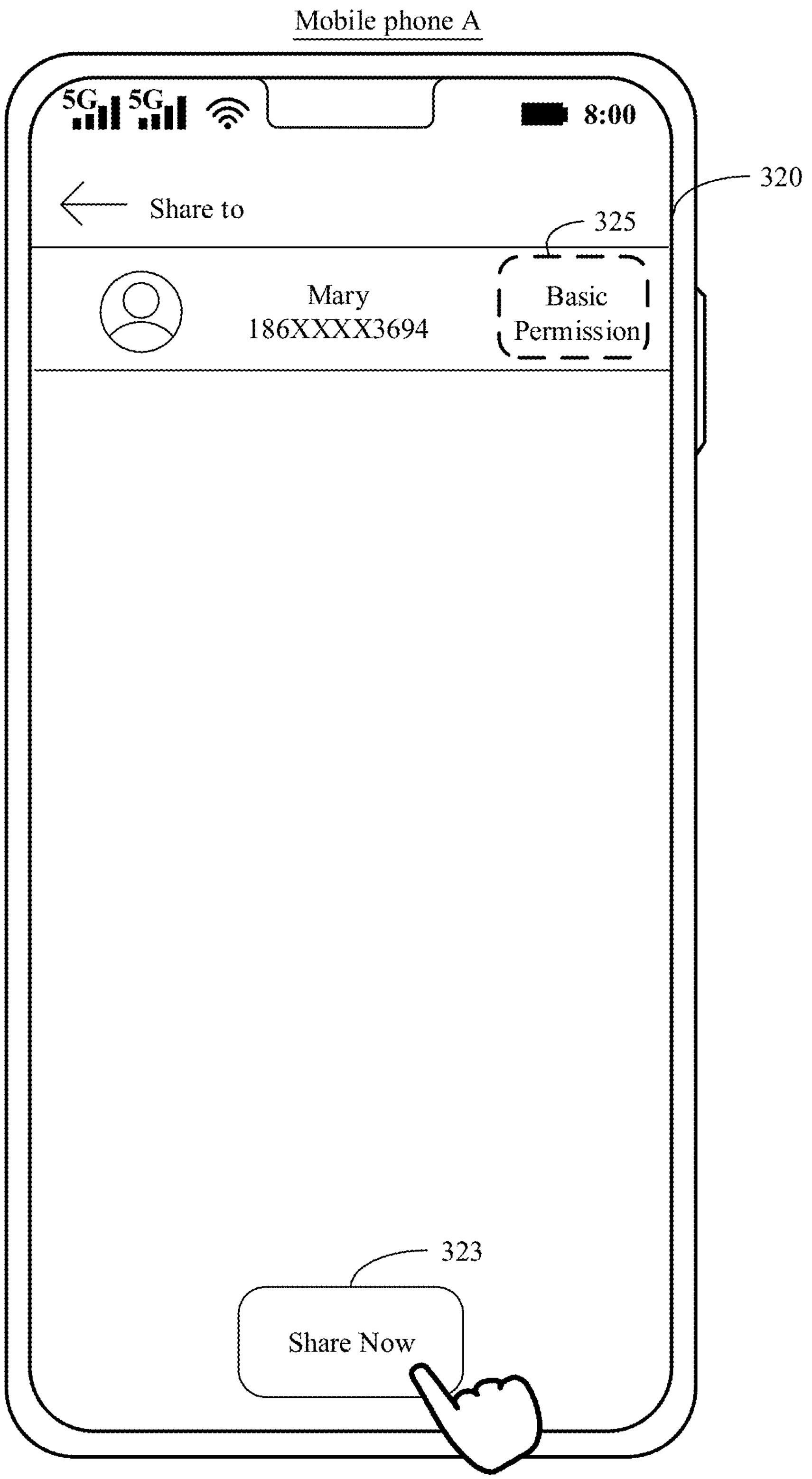

The process in which the user (for example, YOYO) of the mobile phone A shares the smart door lock with another user (for example, a user corresponding to a mobile phone B or a mobile phone C) is described below by using FIG. 5A, FIG. 5B, and FIG. 5C-FIG. 10A and FIG. 10B. It should be noted that the mobile phone A is a device that is in a binding relationship with the smart door lock. Therefore, the mobile phone A has a highest permission (that is, can operate all functions of the smart door lock). The mobile phone A may share some or all functions of the smart door lock with the mobile phone B or the mobile phone C. It may be considered that the mobile phone A is a primary device, and the mobile phone B or the mobile phone C is a secondary device. As shown in FIG. 5A, in response to an operation that the user selects a "Me" tab 311 on a home page 310 of smart household, as shown in FIG. 5B, the mobile phone A may display an interface 312, and the interface 312 may include information about the user (for example, an avatar, a level, or an account of the user) and a corresponding control option (for example, a share option 313, a message center, or a forum). In response to an operation performed by the user on the share option 313 (for example, a tap operation or a touch and hold operation, which is not limited in this application), as shown in FIG. 5C, in response to an operation that the user selects a "Share Device" tab 316*a*, the mobile phone A may display a device sharing interface 315 (a first interface), and the device sharing interface 315 may include a plurality of household devices that can be shared (N to-be-shared devices). For example, household devices such as a television set, a router, a sound box, and a smart door lock may be included. If the user selects a selection button 316*b* corresponding to the smart door lock (a target device), in response to an operation performed by the user on an OK button 316*c*, as shown in FIG. 7A, the mobile phone A may display a sharing interface 317. Alternatively, as shown in FIG. 6A, in response to an operation that the user touches and holds the smart door lock 302, as shown in FIG. 6B, the mobile phone A may display a pop-up window 317, and the pop-up window 317 may include a plurality of operation options, for example, a "Move to Home Screen" option, a share option 318, and a rename option. In response to an operation that the user selects the share option 318, as shown in FIG. 7A, the mobile phone A may display a sharing interface 317 (a fourth interface). The interface 317 may include a plurality of device sharing manners (device sharing protocols), for example, may include: scan the code to add a member, add a member by using an Honor account, add a member through WeChat®, and the like. Optionally, the interface 317 may further include a user with whom a device or a home has been recently (within one week or one month) shared. The recent user may be selected to share the device, and there is no need to scan code, enter an account, or perform selection in a WeChat® list. This is convenient and fast. In response to an operation that the user (for example, YOYO) selects a recent user Mary (a target user), as shown in FIG. 7B, the mobile phone A may display an interface 320, and the interface 320 may include a selected user 321, a permission management button 322, and a "Share Now" button 323. The user can authorize and manage the selected user before performing sharing immediately. For example, in response to an operation performed by the user on the permission management button 322, as shown in FIG. 7C, the mobile phone A may display a permission management pop-up window 324 (a second interface), and the pop-up window 324 may include options such as Basic permissions, Advanced permissions, and Super permissions. If the user selects the basic permission (a target option), in response to an operation performed by the user on an OK button, as shown in FIG. 7D, the mobile phone A may display prompt information 325, to prompt the user that Mary's permission is a basic permission. Then, in response to an operation performed by the user on the "Share Now" button 323, the mobile phone A may share a basic function of the device (the smart door lock) with the user Mary. The basic permission corresponds to the basic function of the smart door lock, that is, a user authorized with the basic permission can use only the basic function of the smart door lock. The advanced permission corresponds to an advanced function of the smart door lock, that is, a user authorized with the advanced permission can use the advanced function of the smart door lock. The super permission corresponds to the basic function of the smart door lock, that is, a user authorized with the super permission can use the super function of the smart door lock. For example, the basic function may include functions such as real-time checking, near-field door opening, and battery level checking, the advanced function may include functions such as remote door opening and fingerprint entering, and the super function may include functions such as password management, device adding, and checking a historical video of a camera.

Figure 8A:
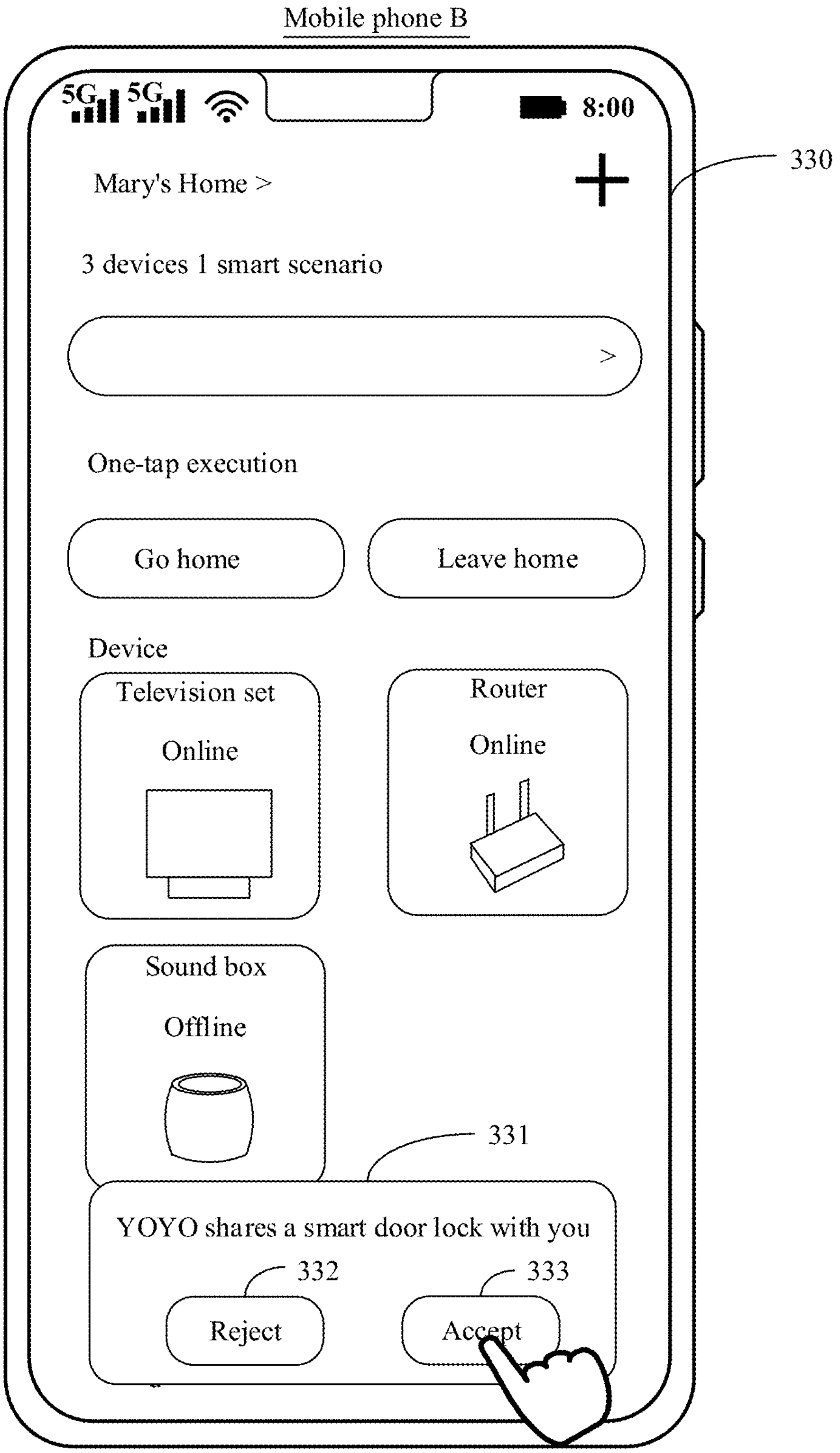
FIG. 8A and FIG. 8B are another schematic diagram of display according to an embodiment of this application.
Figure 8B:
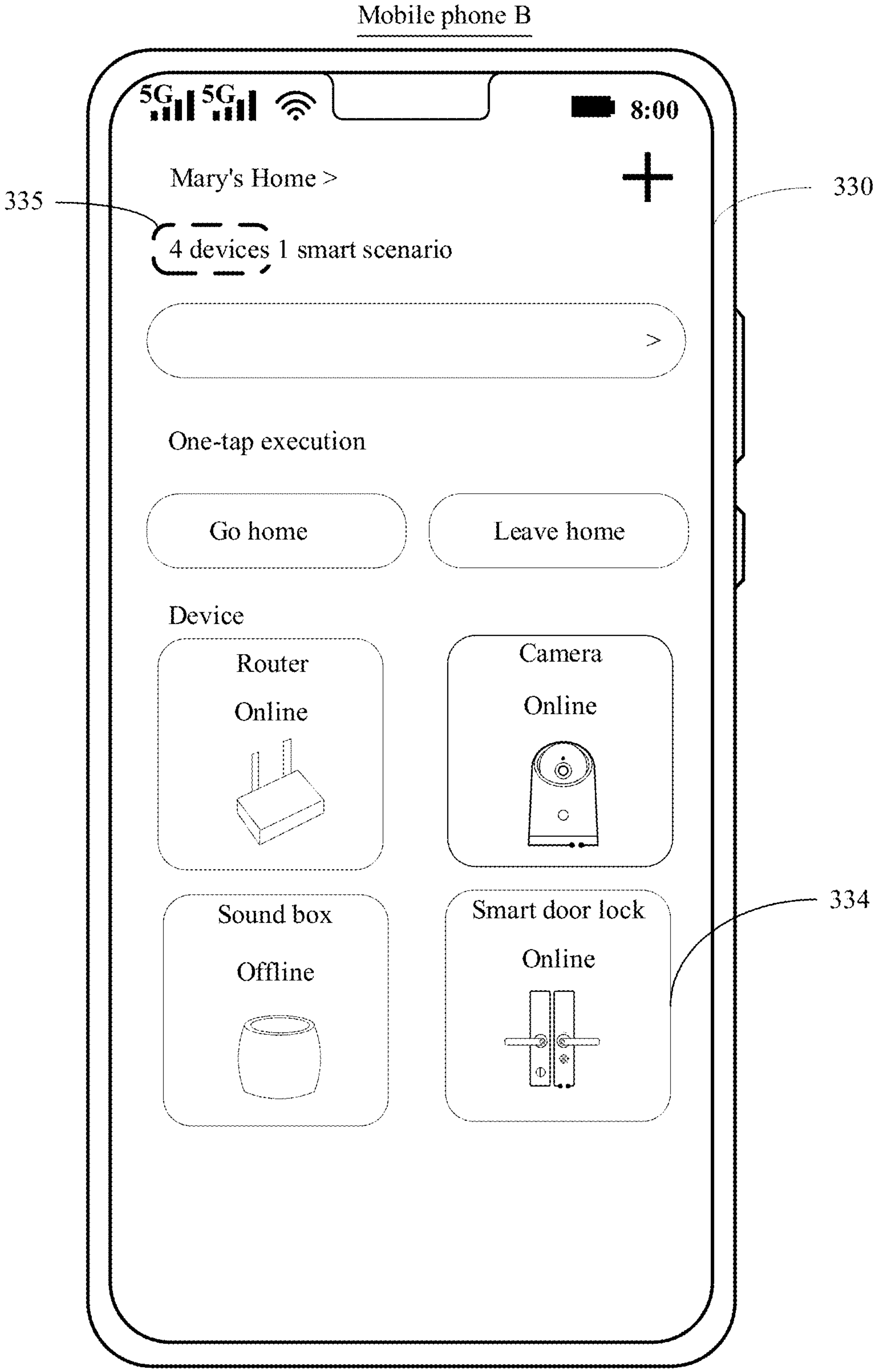

As shown in FIG. 8A, after the user Mary opens a smart household APP on the mobile phone B, the mobile phone B may display a pop-up window 331 in an interface 330 of the smart household APP. The pop-up window 331 may include prompt text "YOYO shares a smart door lock with you". The pop-up window 331 may further include a refuse button 332 and an accept button 333. In response to an operation performed by the user on the accept button 333, as shown in FIG. 8B, a card 334 corresponding to the smart door lock may be added to the interface 330 of the smart household APP. In addition, a quantity of devices can be refreshed from three devices to four devices in a display area 335. In addition, the mobile phone B may also display a notification message in a notification bar, and the notification message is used to indicate that another user shares the smart door lock with "me". In response to an operation that the user taps the notification message in the notification bar, the mobile phone B may jump to the smart household APP.

Figure 9A:
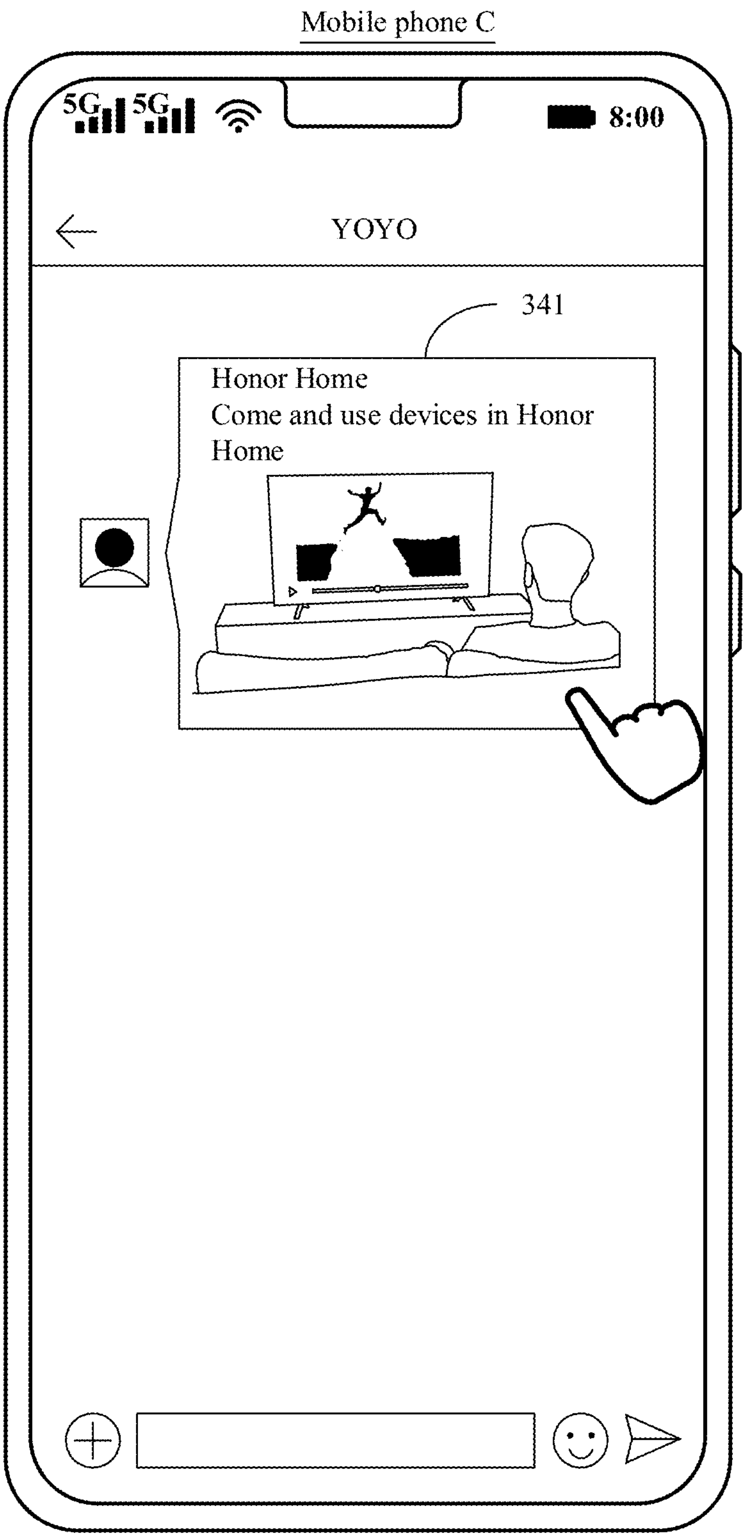
FIG. 9A, FIG. 9B, FIG. 9C, and FIG. 9D are another schematic diagram of display according to an embodiment of this application.
Figure 9B:
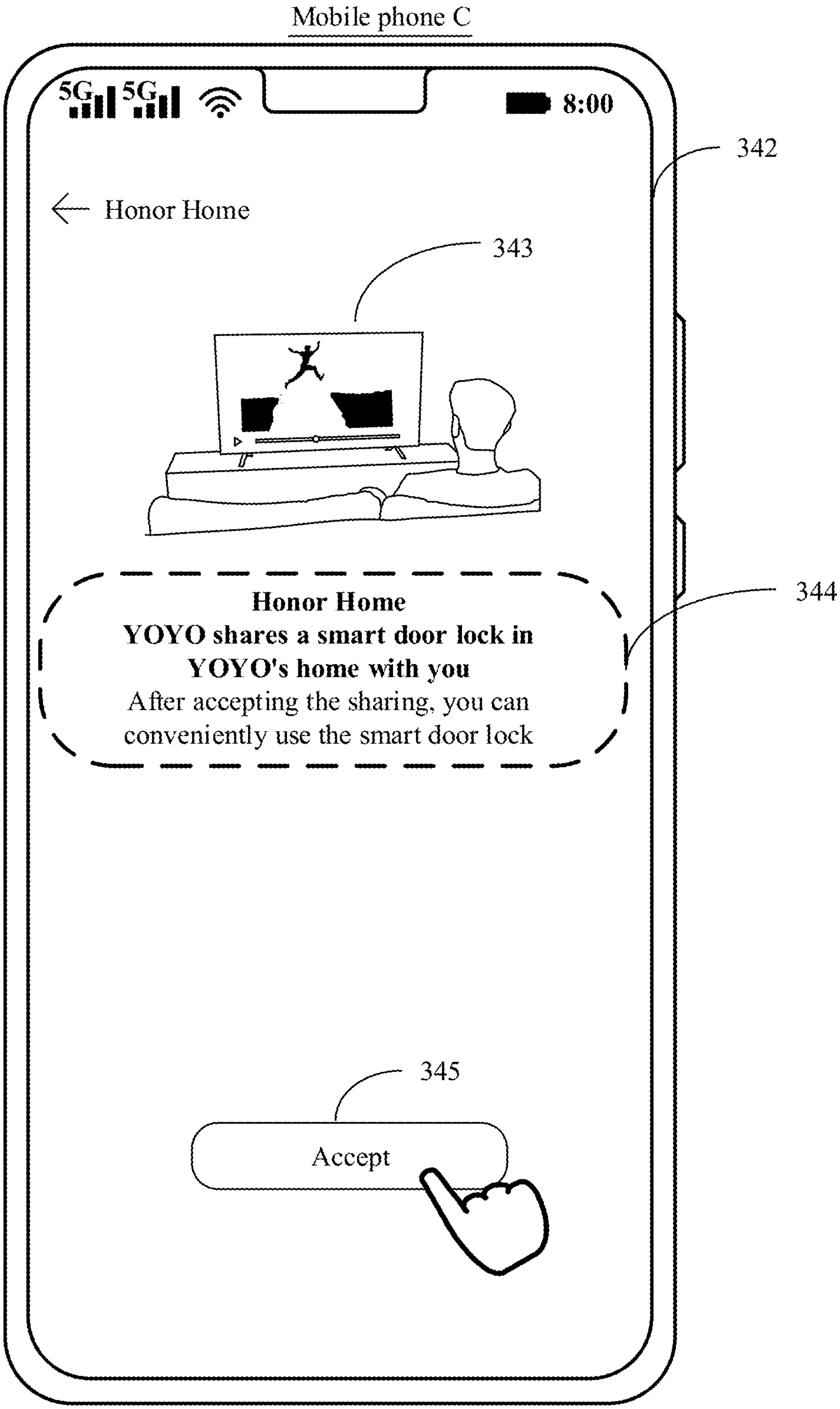
Figure 9C:
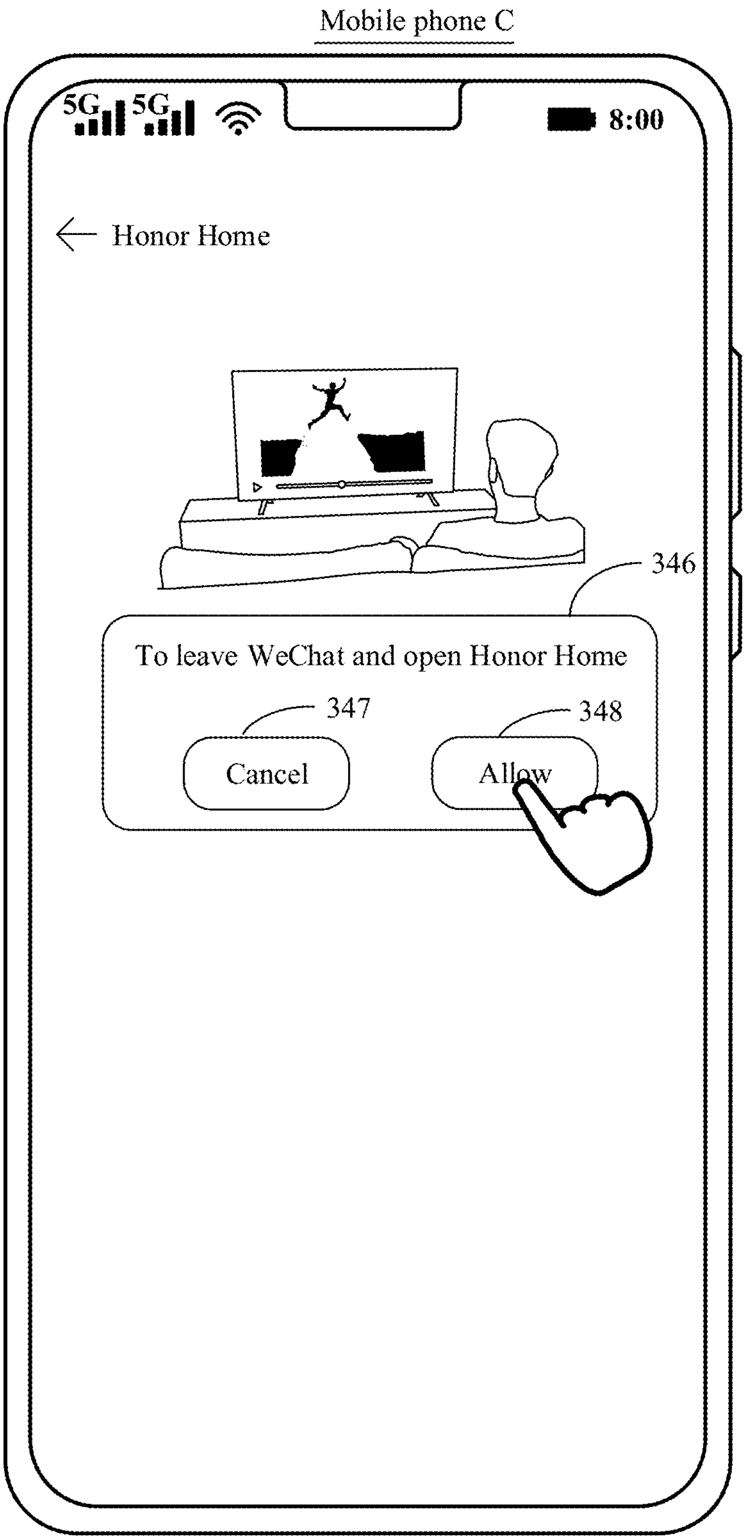
Figure 9D:
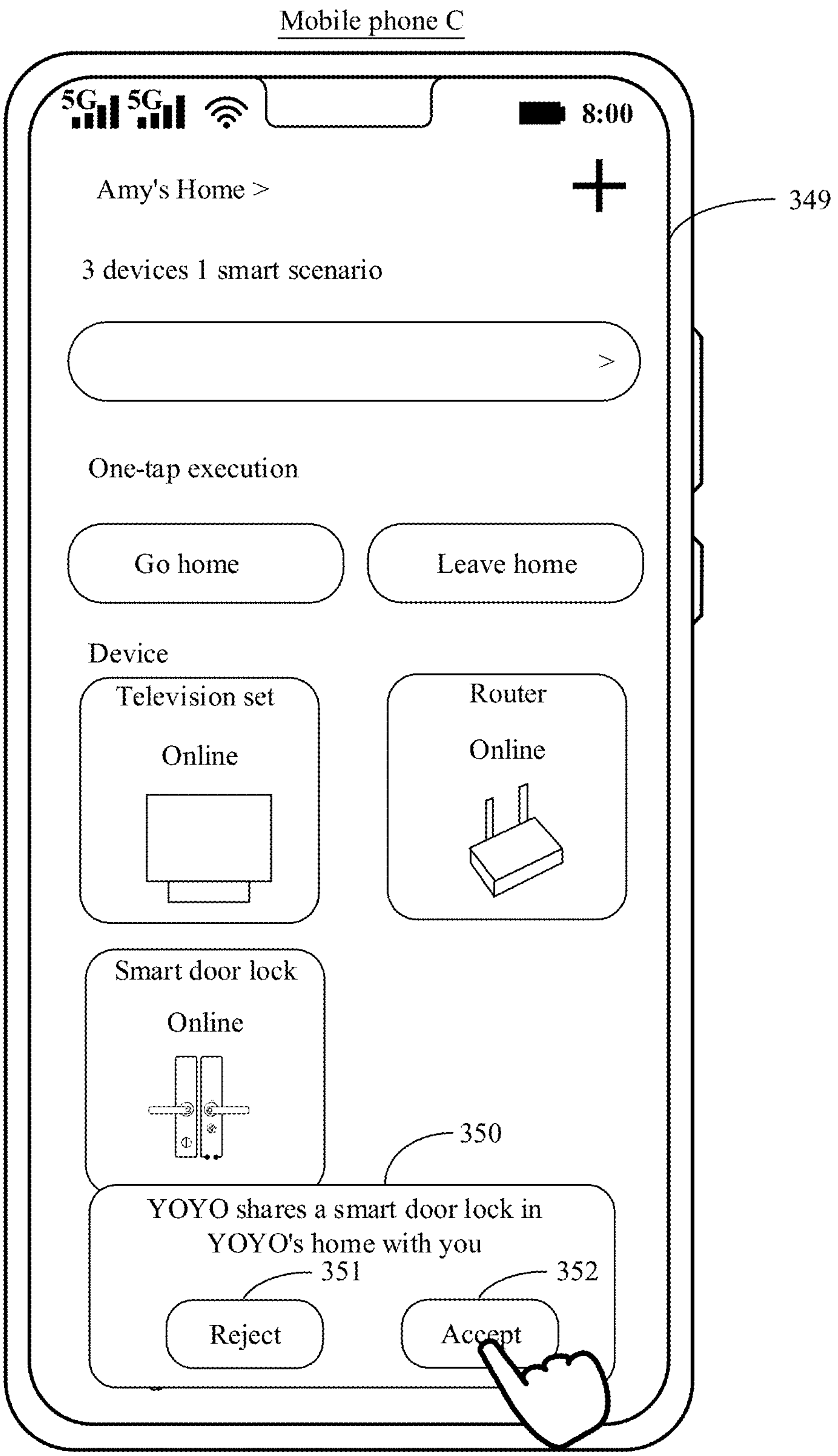

In another possible design, as shown in FIG. 7A, if the user (for example, YOYO) of the mobile phone A chooses, through WeChat®, to share the smart door lock with a user Amy, as shown in FIG. 9A, the user Amy may receive, through a WeChat® application on the mobile phone C, a message 341 sent by the user YOYO. In response to tapping of the message 341 by the user, as shown in FIG. 9B, the mobile phone C may display an interface 342 of Honor Home. The interface 342 may include a picture 343 and prompt text 344. The picture 343 is used to notify the user of an application scenario of Honor Home. The prompt text 344 is used to indicate the user to open Honor Home to check a smart device that is shared by another user. The interface 342 may further include an accept button 345. In response to an operation performed by the user on the accept button 345, as shown in FIG. 9C, the mobile phone C may display a pop-up window 346. The pop-up window 346 is used to prompt the user that the user is to leave WeChat® and open Honor Home. The pop-up window 346 may further include a cancel button 347 and an allow button 348. In response to an operation that the user taps the allow button 348, as shown in FIG. 9D, the mobile phone C may open the smart household APP, and display a pop-up window 331 in an interface 330 of the smart household APP. The pop-up window 331 may include prompt text "YOYO shares a smart door lock with you". The pop-up window 331 may further include a refuse button 332 and an accept button 333. In response to an operation performed by the user on the accept button 333, the smart door lock may be added to Amy's home, so that the user Amy can control the smart door lock.

Figure 10A:
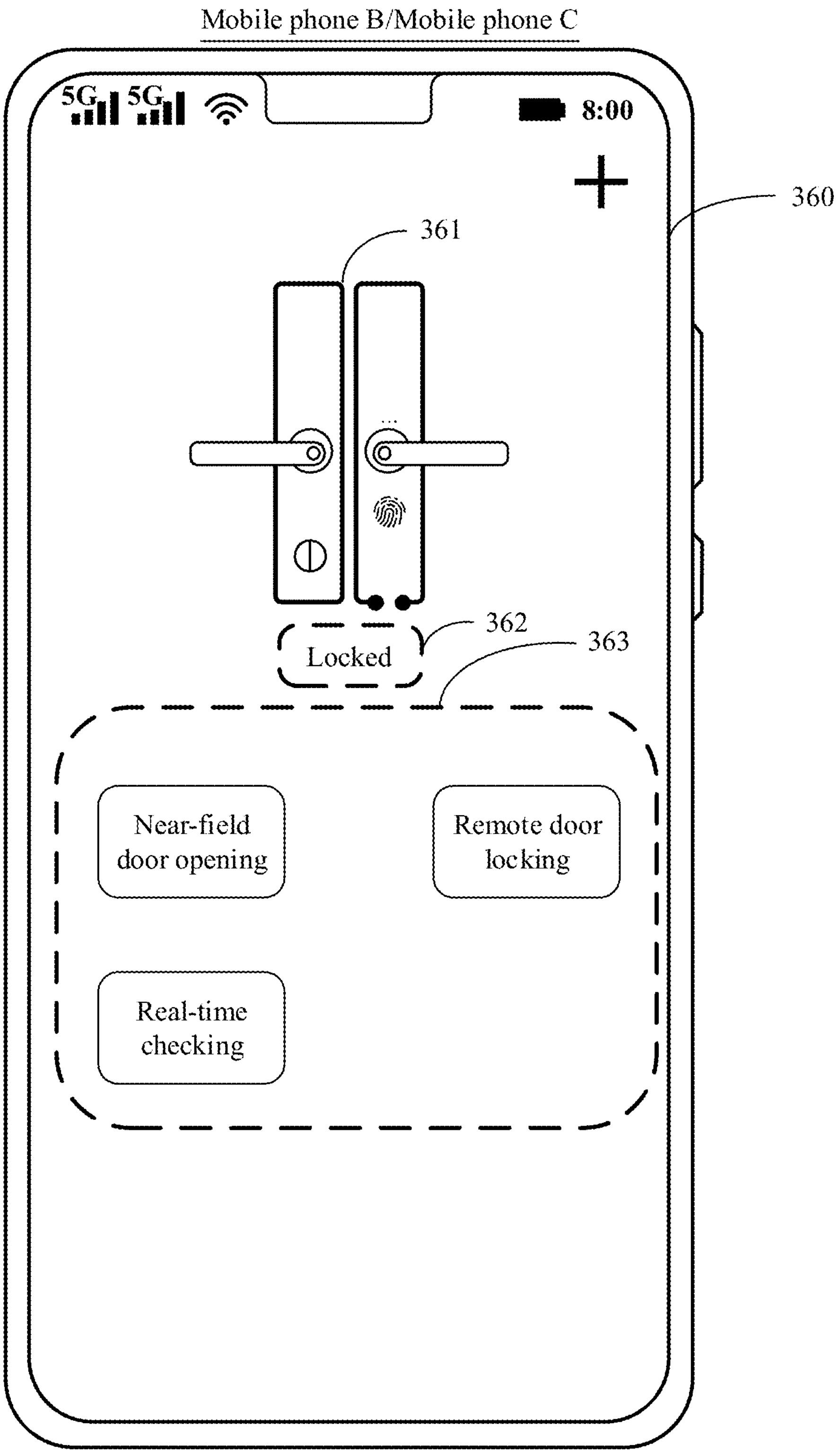
FIG. 10A and FIG. 10B are another schematic diagram of display according to an embodiment of this application.
Figure 10B:
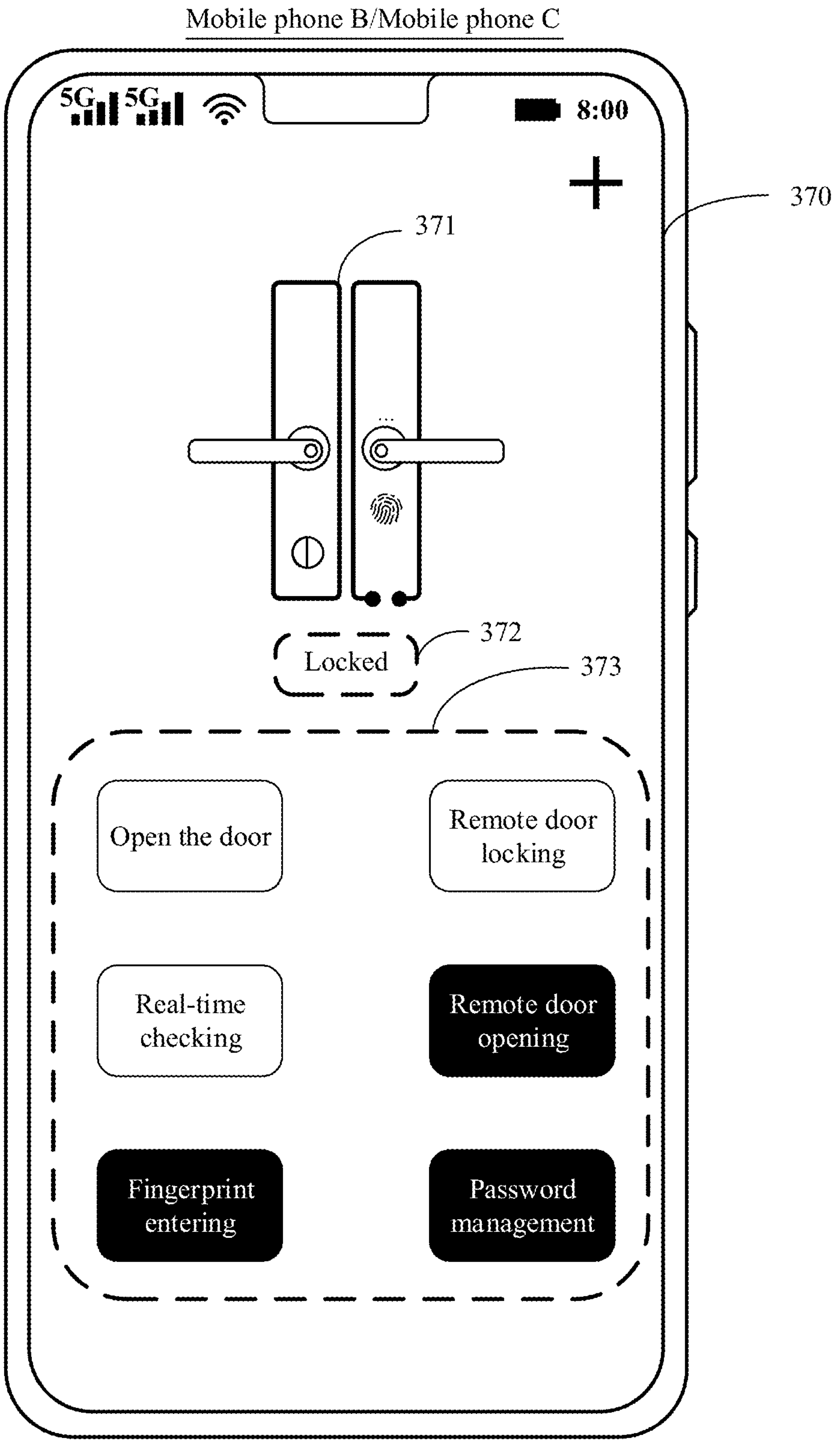

For example, if a permission of the user corresponding to the mobile phone B or the mobile phone C is the basic permission, as shown in FIG. 10A, the mobile phone B or the mobile phone C may display a function interface 360 (a third interface) of the smart door lock. The interface 360 includes an icon 361 of the smart door lock, a status (for example, locked) 362 of the smart door lock, and a function control area 363. The function control area 363 may include a near-field door opening button, a remote door locking button, and a real-time checking button (that is, a first control, where the first control may include one or more controls). In other words, a function interface of the smart door lock different from that of the mobile phone A may be presented. Alternatively, as shown in FIG. 10B, the mobile phone B or the mobile phone C may display a function interface 370 of the smart door lock, and the interface 370 includes an icon 371 of the smart door lock, a status (for example, locked) 372 of the smart door lock, and a function control area 373. The function control area 373 may include a near-field door opening button, a remote door locking button, a real-time checking button, a remote door opening button, a fingerprint entering button, and a password management button (that is, a second control, where the second control may include the first control and a third control). The near-field door opening button, the remote door locking button, and the real-time checking button are available (the near-field door opening button, the remote door locking button, and the real-time checking button are first controls), and buttons such as the remote door opening button, the fingerprint entering button, and the password management button are set to gray (the remote door opening button, the fingerprint entering button, and the password management button are third controls), that is, are unavailable.

A process in which the user (for example, YOYO) of the mobile phone A shares a home (for example, YOYO's home) with another user is described below by using FIG. 11A, FIG. 11B, and FIG. 11C and FIG. 12A, FIG. 12B, FIG. 12C, and FIG. 12D.

Figure 11A:
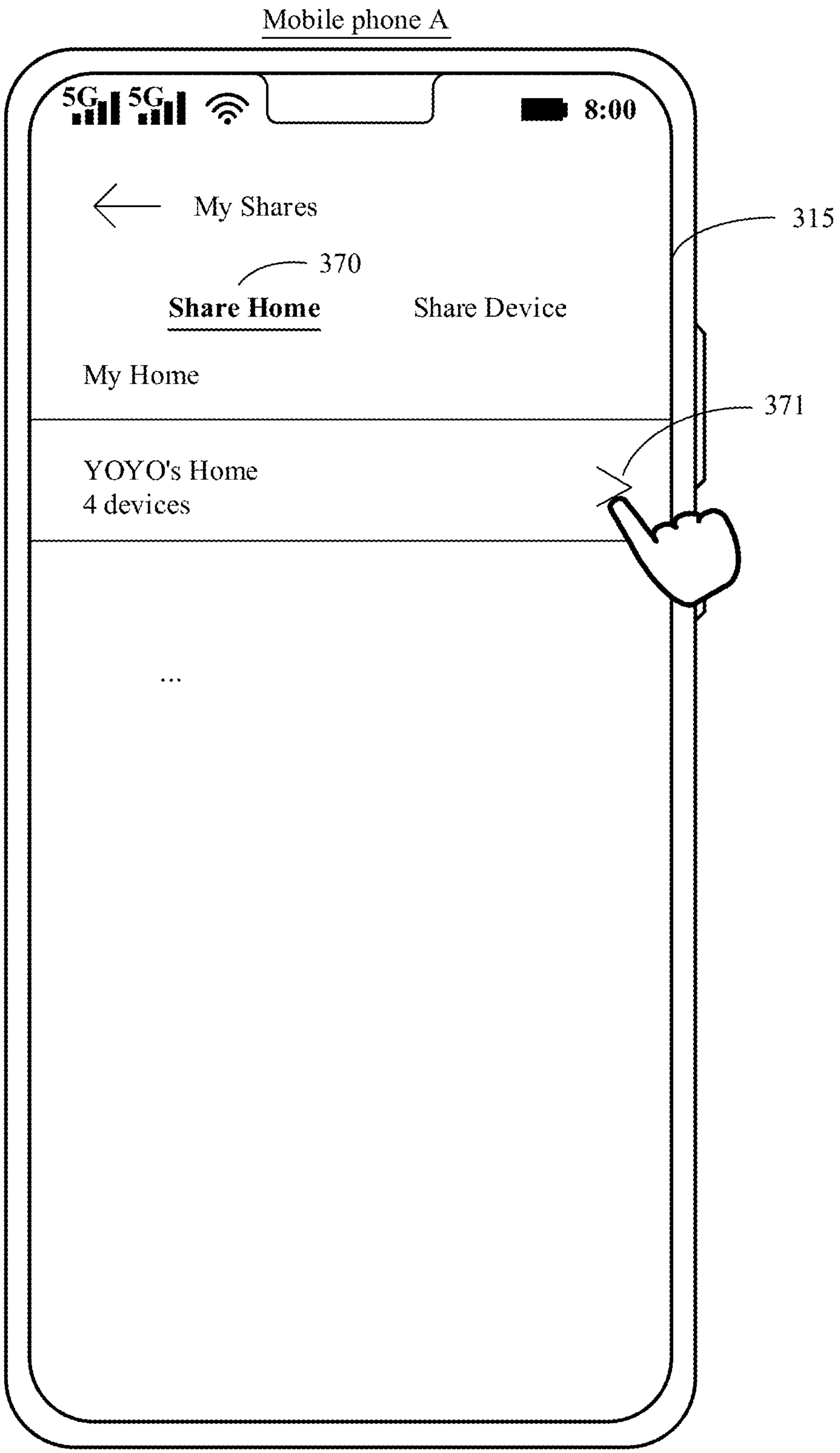
FIG. 11A, FIG. 11B, and FIG. 11C are another schematic diagram of display according to an embodiment of this application.
Figure 11B:
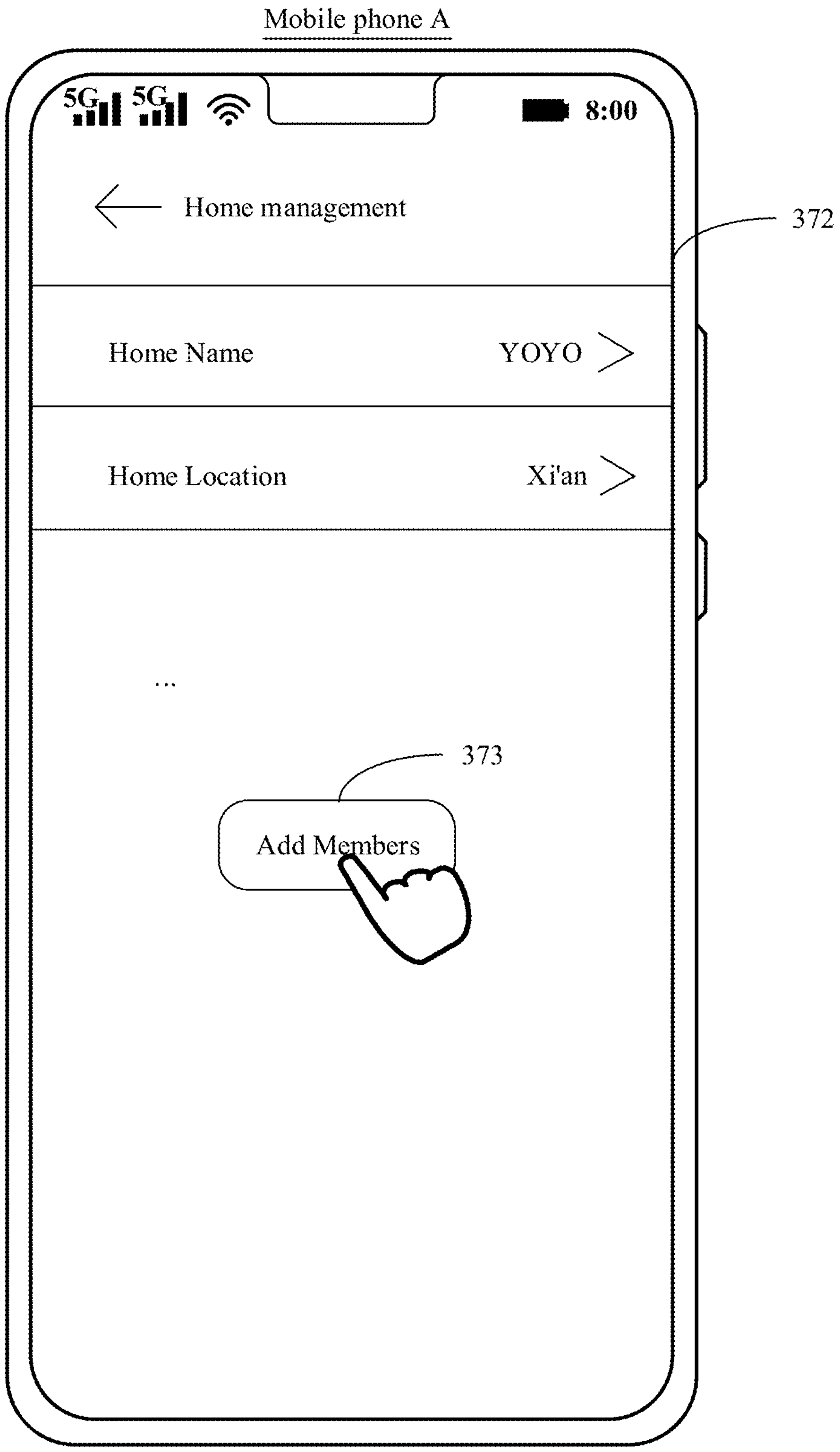
Figure 11C:
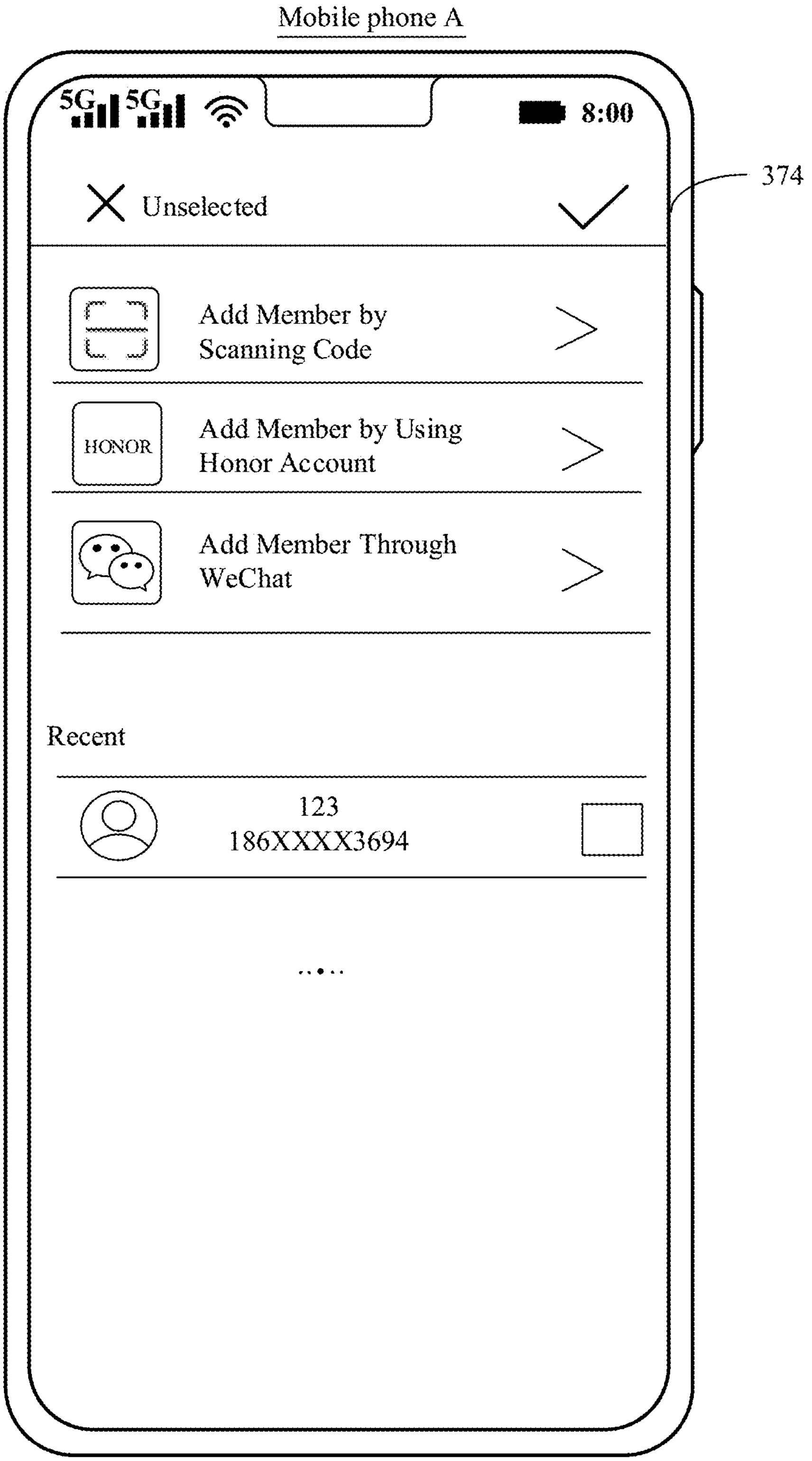

As shown in FIG. 11A, in response to an operation that the user selects a "Share Home" tab 370 (a fourth control), the mobile phone A may display a home sharing interface 315 (a sixth interface), and the home sharing interface 315 may display joined homes, for example, may include YOYO's home. Certainly, the home sharing interface 315 may also include another home joined by the user. This is not limited herein. In response to an operation performed by the user on the control 371 corresponding to YOYO's home, as shown in FIG. 11B, the mobile phone A may display a home management interface 372. The home management interface 372 may include information such as a home name (for example, YOYO) and a home location (for example, Xi'an), and may further include an "Add Member" button 373. In response to an operation performed by the user on the add button 373, as shown in FIG. 11C, the mobile phone A may display an interface 374. The interface 374 may include a plurality of sharing manners, for example, may include a manner of adding a member by scanning code, adding a member by using an Honor account, and adding a member through WeChat®, to share a home. Optionally, the interface 317 may further include a user to whom a device or a home has been recently shared. The user may directly select the recent user to share the home, and does not need to scan code, enter an account, or perform selection in a WeChat® list. This is convenient and fast. After the user adds a member (a target user), the user may further select a permission for the target user. Refer to FIG. 7A, FIG. 7B, FIG. 7C, and FIG. 7D and related descriptions of FIG. 7A, FIG. 7B, FIG. 7C, and FIG. 7D. Details are not described herein again.

Figure 12A:
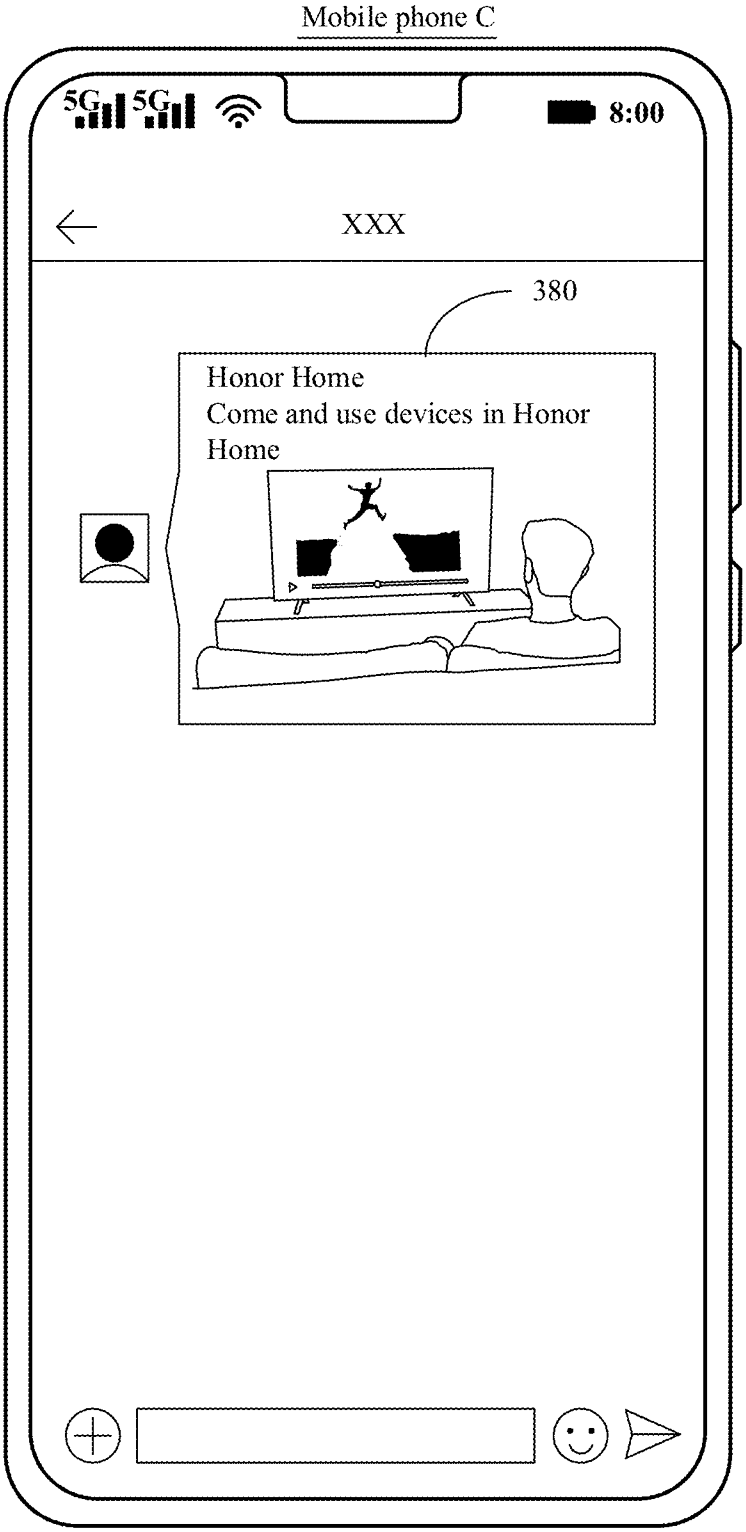
FIG. 12A, FIG. 12B, FIG. 12C, and FIG. 12D are another schematic diagram of display according to an embodiment of this application.
Figure 12B:
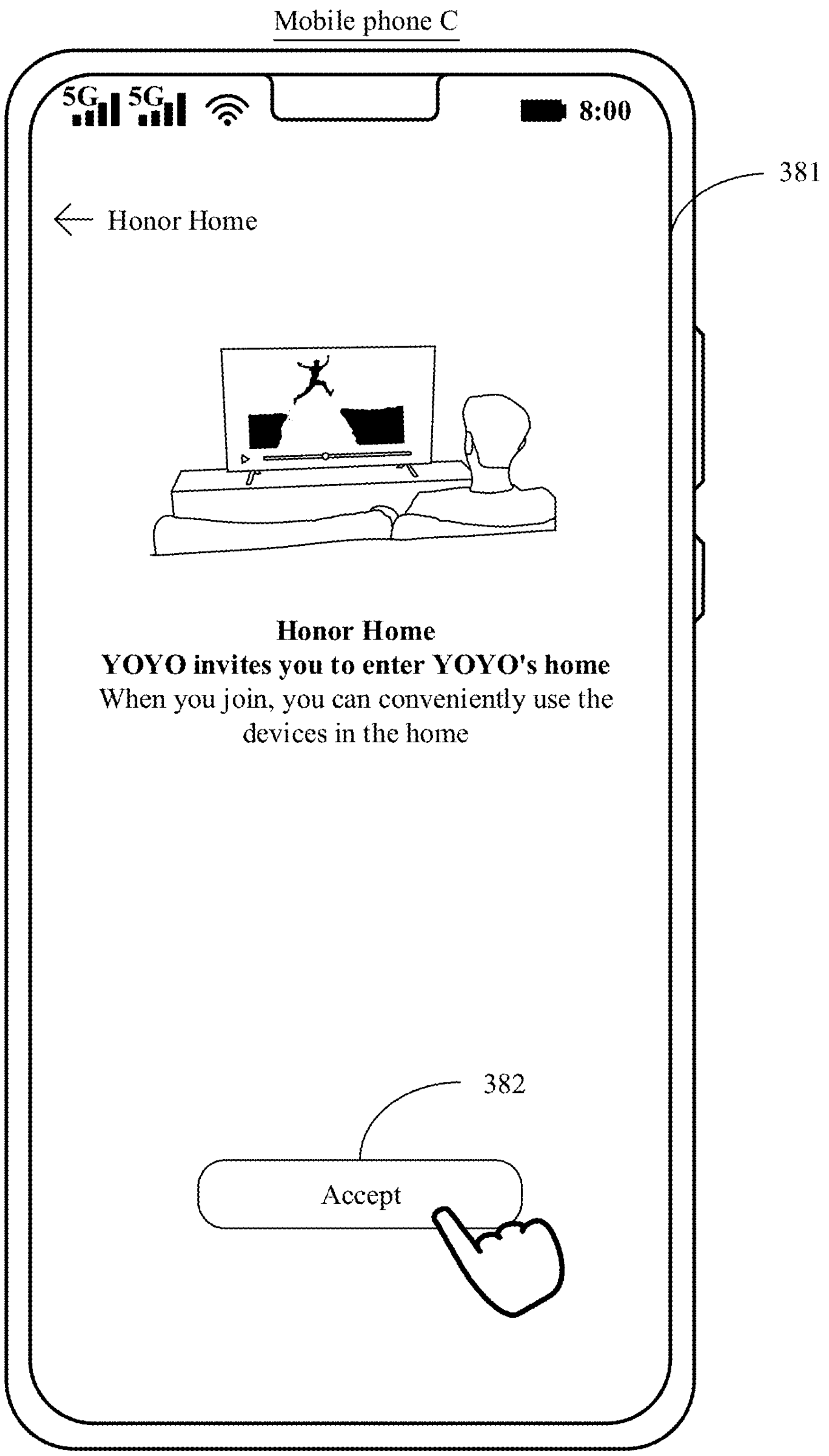
Figure 12C:
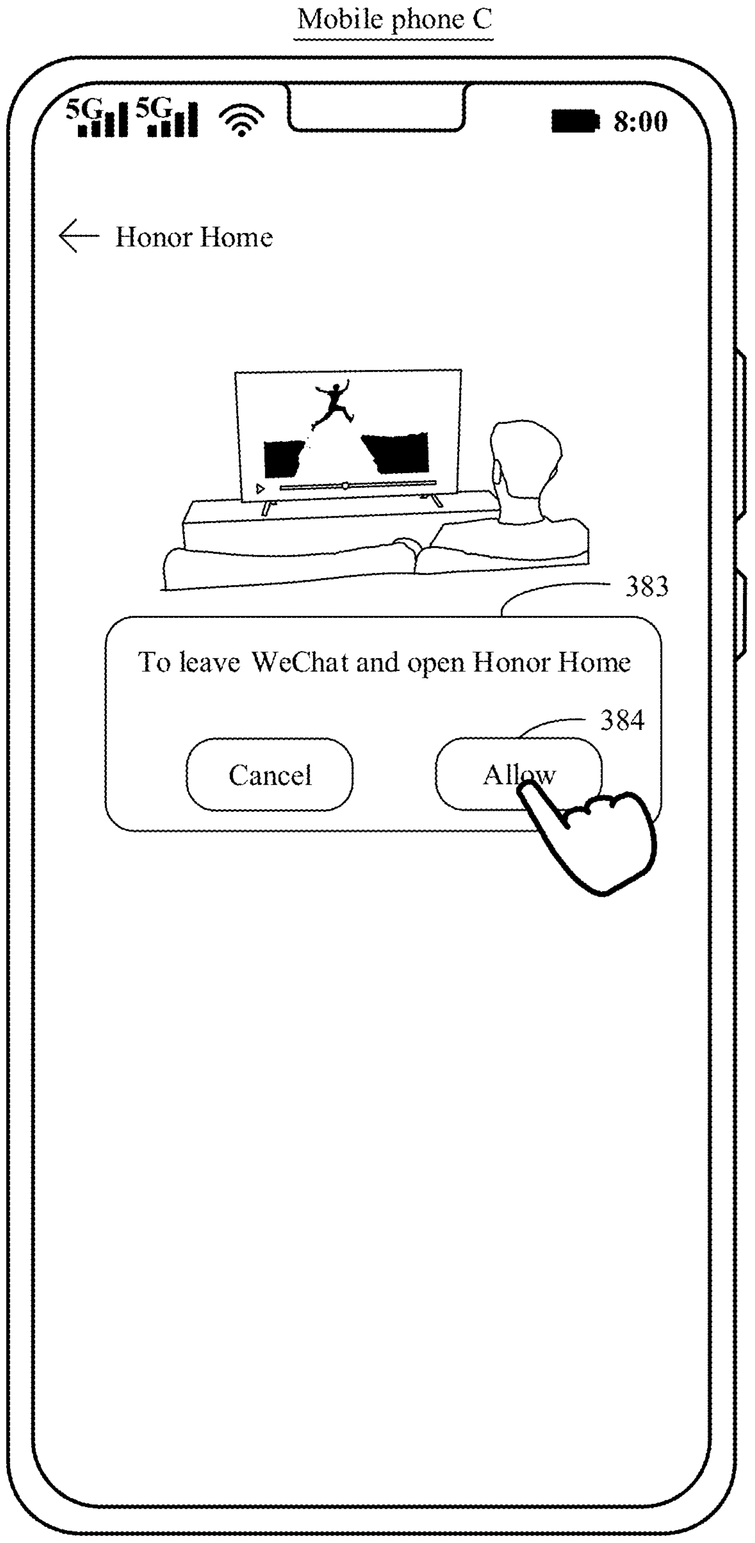
Figure 12D:
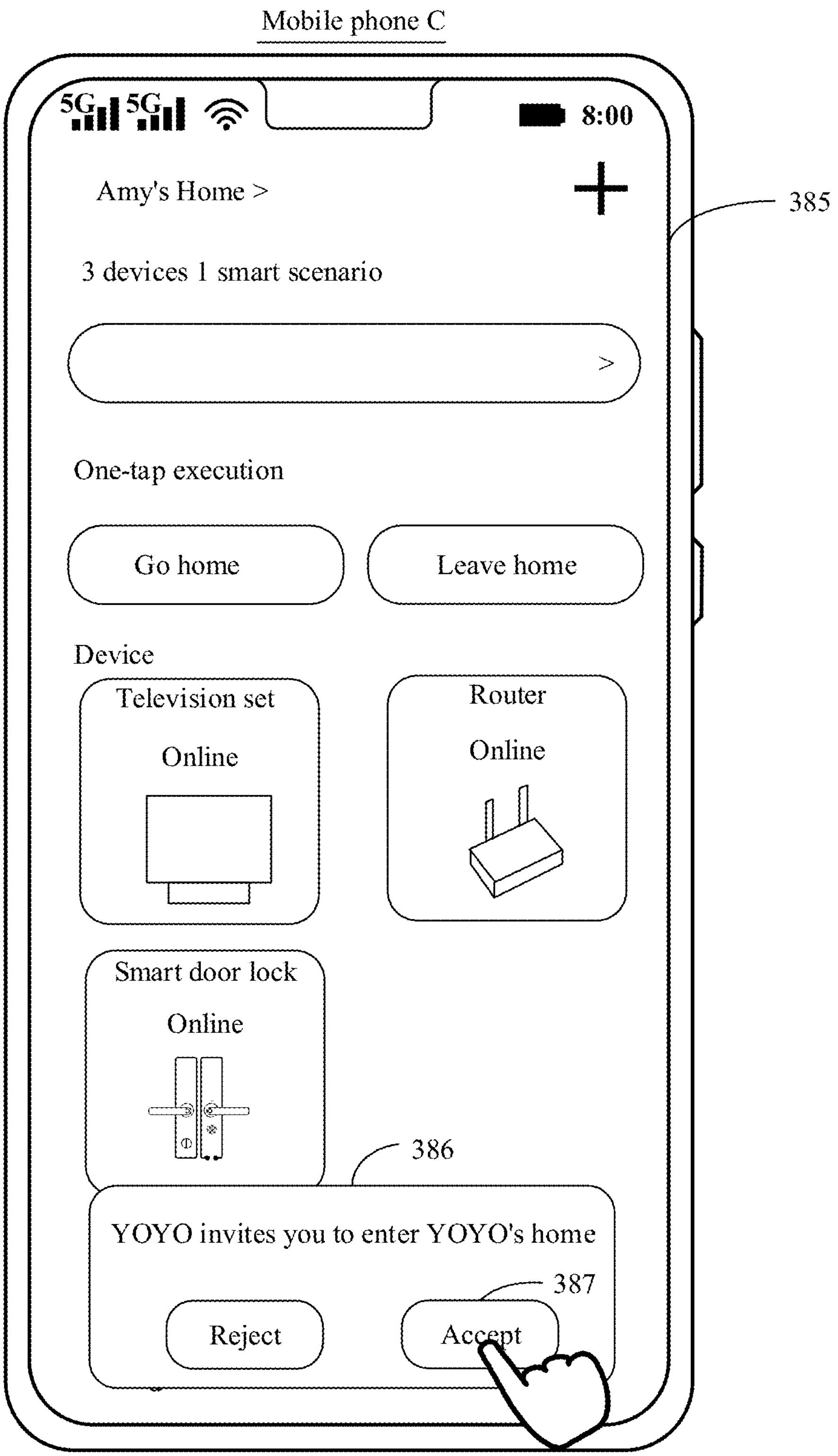

If the user (for example, YOYO) of the mobile phone A chooses to share the home with the user Amy through WeChat®, as shown in FIG. 12A, the user Amy may receive, through a WeChat® application on the mobile phone C, a message 380 sent by the user YOYO. In response to tapping of the message 380 by the user, as shown in FIG. 12B, the mobile phone C may display an interface 381 of Honor Home. The interface 381 may include a prompt picture and prompt text that are used to prompt the user to open Honor Home to check a home shared by another user. The interface 342 may further include an accept button 382. In response to an operation performed by the user on the accept button 382, as shown in FIG. 12C, the mobile phone C may display a pop-up window 383. The pop-up window 383 is used to prompt the user that the user is to leave WeChat® and open Honor Home. In response to an operation that the user taps an allow button 384, as shown in FIG. 12D, the mobile phone C may open a smart household APP, and display a pop-up window 386 in an interface 385 of the smart household APP. The pop-up window 386 may include prompt text "YOYO invites you to enter YOYO's home". In response to an operation performed by the user on an accept button 387, YOYO's home may be added to Honor Home of the user Amy, so that the user Amy can control all smart devices in YOYO's home.

Figure 13:
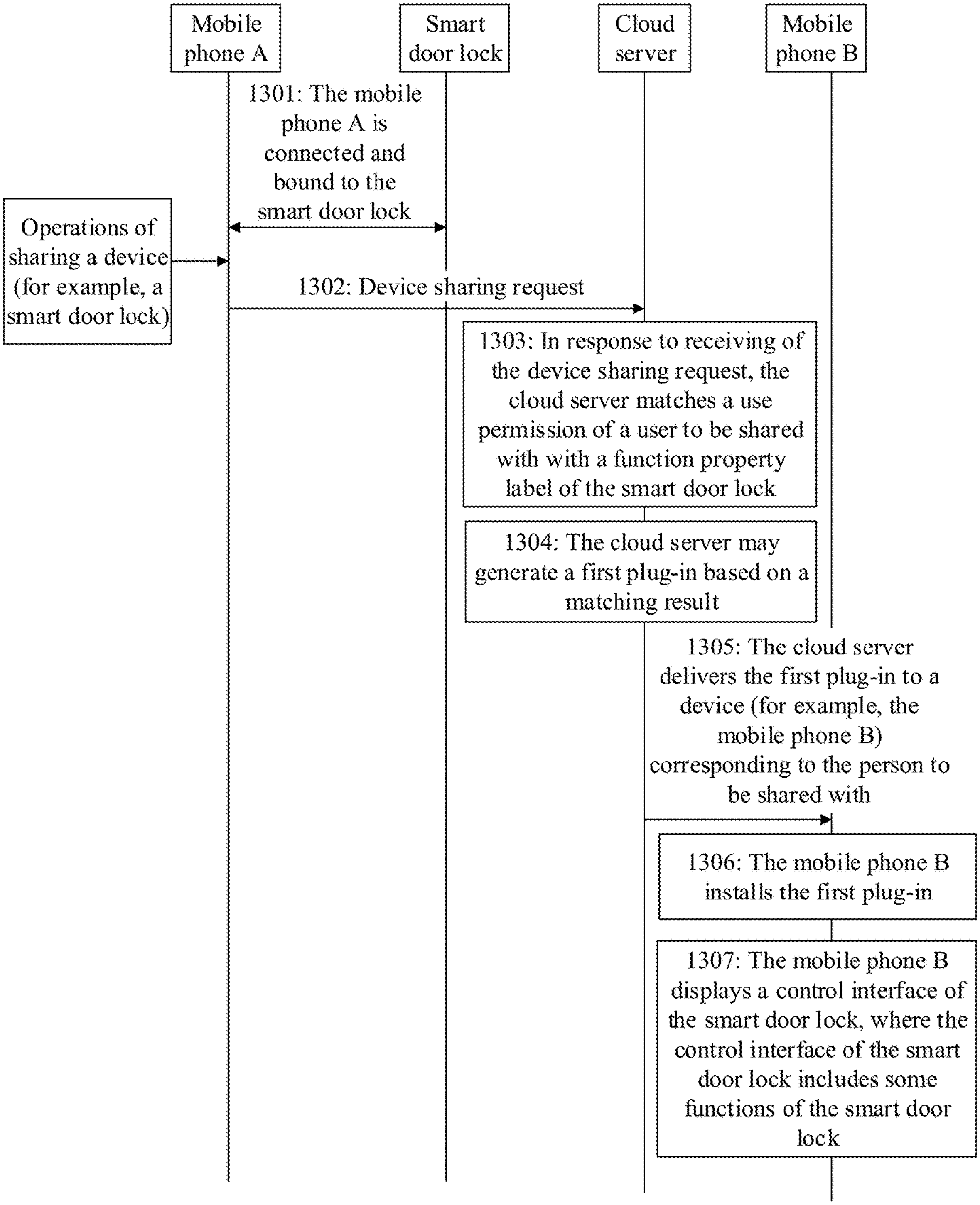
FIG. 13 is a schematic diagram of signal interaction according to an embodiment of this application.

As shown in FIG. 13, an embodiment of this application provides a method for sharing a function of a smart household device. The method is described by using an example in which a first electronic device is a mobile phone A, a second electronic device is a mobile phone B, and a smart household device is a smart door lock. The method includes the following steps.

1301: The mobile phone A is connected and bound to the smart door lock.

In an implementation, the mobile phone A and the smart door lock may access a same local area network, so that a network connection is established between the mobile phone A and the smart door lock. After starting a smart household APP, in response to an operation that a user adds a device, the mobile phone A may scan nearby devices based on a short range communication technology (for example, a proximity discovery technology of Bluetooth/WIFI). After scanning the smart door lock, the mobile phone A may add the smart door lock to the smart household APP. In a process of adding the smart door lock, the mobile phone A may enter an account and a password, or may enter a mobile phone number/user name and a verification code, to be bound to the smart door lock.

After the mobile phone A is bound to the smart door lock, in response to an operation that the user selects the smart door lock, the mobile phone A may display a control interface of the smart door lock. The control interface of the smart door lock may include all functions of the smart door lock, and each function is in an operable state. The control interface of the smart door lock displayed on the mobile phone A may be shown in FIG. 4B. It should be noted that FIG. 4A and FIG. 4B show merely an example of the control interface of the smart door lock on the mobile phone A. All control buttons of the smart door lock may alternatively not be displayed in a same interface. This is not limited in this application.

In a possible design, there may be a plurality of control interfaces of the smart door lock on the mobile phone A, and different control interfaces include different control buttons. For example, the smart door lock may correspond to two control interfaces: a status management interface and a setting interface. The status management interface may include function buttons such as near-field door opening, remote door locking, real-time checking, and remote door opening. The setting interface may include control buttons such as fingerprint entering and password management.

1302: In response to an operation that the user shares a device, the mobile phone A sends a device sharing request to a cloud server.

For example, as shown in FIG. 7D, after the user selects a user (Mary) to be shared with, in response to an operation that the user taps a "Share Now" button 323, the mobile phone A may send, to the cloud server, a request used for sharing the smart door lock.

The device sharing request may carry an identifier of a family member (for example, Mary) selected by a user YOYO and permission information of the family member. The identifier of the family member may include information such as an application account (for example, an Honor account or a WeChat® account) of the family member or an ID of a device (for example, the mobile phone B) used by the family member. A permission of the family member (for example, Mary) may be manually set by the user (for example, YOYO). The permission of the family member may be a basic permission, an advanced permission, or a super permission.

In some embodiments, the basic permission corresponds to a basic function of a smart device (for example, the smart door lock), that is, a user authorized with the basic permission can use only the basic function of the smart door lock. The advanced permission corresponds to an advanced function of the smart device (for example, the smart door lock), that is, a user authorized with the advanced permission can use the advanced function of the smart door lock. The super permission corresponds to a super function of the smart device (for example, the smart door lock), that is, a user authorized with the super permission can use the super function of the smart door lock. The basic function may include functions such as real-time checking, near-field door opening, and battery level checking. The advanced function may further include functions such as remote door opening and fingerprint entering in addition to the basic function. The super function may further include functions such as password management, device adding, and a function of checking a historical video of a camera in addition to the advanced function.

If a person to be shared with (the family member) corresponds to a permission of using the basic function, the person may be referred to as a basic user. If the person to be shared with corresponds to a permission of using the advanced function, the person may be referred to as an advanced user. If the person to be shared with corresponds to a permission of using the super function, the person may be referred to as a super user.

1303: In response to receiving of the device sharing request, the cloud server matches a use permission of the user to be shared with with a function property label of the smart door lock.

The function property label of the smart door lock may be included in a device profile of the smart door lock. The device profile of the smart door lock may be sent by the smart door lock to the cloud server after the smart door lock is connected to WIFI, or may be sent by the smart door lock to the mobile phone A through near field communication (for example, Bluetooth communication) after the mobile phone A is bound to the smart door lock, and then sent by the mobile phone A to the cloud server. The device profile of the smart door lock may be predefined in the smart door lock.

The device profile of the smart door lock may include a plurality of function properties (the function property may also be referred to as a function for short). Each function property may correspond to one function property label, and the function property label is used to describe a type of a function property.

Figure 14:
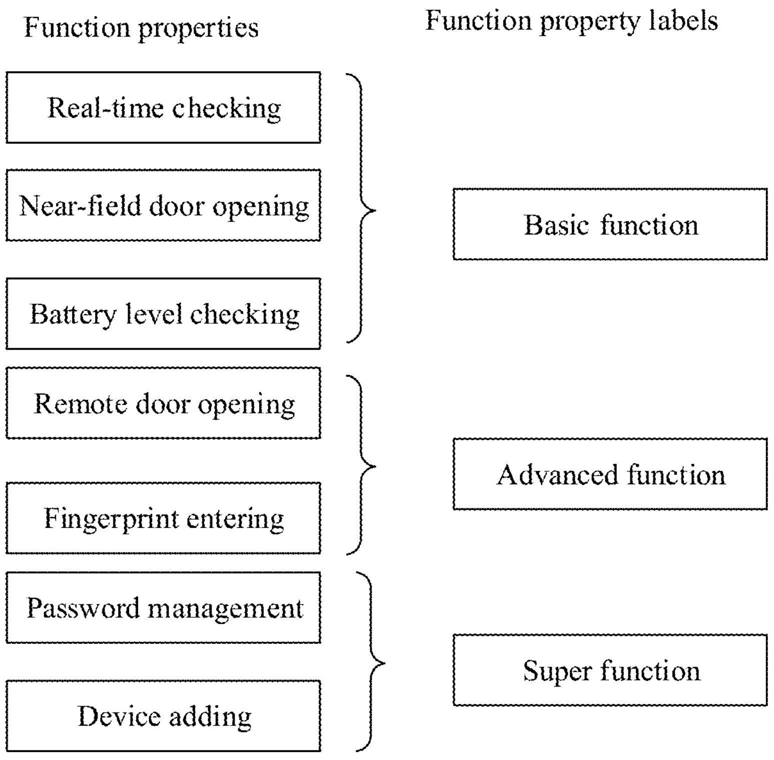
FIG. 14 is a schematic diagram of a function property and a function property label according to an embodiment of this application.

In a possible design, types of function properties may be classified based on operation complexity. The basic function, the advanced function, and the super function may be included in descending order of operation complexity. In other words, the function property label includes labels such as the basic function, the advanced function, and the super function. For example, as shown in FIG. 14, function properties such as real-time checking, near-field door opening, and battery level checking may correspond to the basic function property label. Function properties such as remote door opening and fingerprint entering may correspond to the advanced function property label. Functions such as password management, device adding, and checking a historical video of a camera may correspond to the super function property label.

In another possible design, the types of the function properties may be classified based on security requirements. A non-security function, a security function, a privacy function, and the like may be included in descending order of security requirements. In other words, the function property label includes labels such as the non-security function, the security function, and the privacy function. A permission of a person to be shared with is: The person can directly use the non-security function, use the security function after entering a password, and cannot use the privacy function. The privacy function can be used only by a user who creates a home.

In still another possible design, the types of the function properties may be classified based on roles of the function properties. For example, functions of the smart door lock may be classified into a control function and a management function. In other words, the function property label includes labels such as the control function and the management function. A permission of a person to be shared with may be: The person is allowed to use the control function. Alternatively, the permission of the person to be shared with may be: The person is allowed to use the management function. Alternatively, the permission of the person to be shared with may be: The person is allowed to use the management function and the control function.

That the cloud server matches the use permission of the person to be shared with with the function property label of the shared device (the smart door lock) may be: The cloud server determines, based on the use permission of the person to be shared with and the function property label of the shared device (the smart door lock), a function that the person to be shared with is allowed to use and a function that the person to be shared with is not allowed to use. When function property labels of the smart door lock are classified based on function complexity requirements, if the use permission of the person to be shared with is the basic permission, it is determined that the person to be shared with is allowed to use the basic function, but is not allowed to use the advanced function or the super function; if the use permission of the person to be shared with is the advanced permission, it is determined that the person to be shared with is allowed to use the advanced function, but is not allowed to use the super function; and if the use permission of the person to be shared with is the super permission, it is determined that the person to be shared with is allowed to use the super function (that is, the person to be shared with is allowed to use all functions of the device). In this embodiment of this application, if the person to be shared with corresponds to a permission of using the basic function, the person may be referred to as a basic user; if the person to be shared with corresponds to a permission of using the advanced function, the person may be referred to as an advanced user; and if the person to be shared with corresponds to a permission of using the super function, the person may be referred to as a super user.

Figure 15:
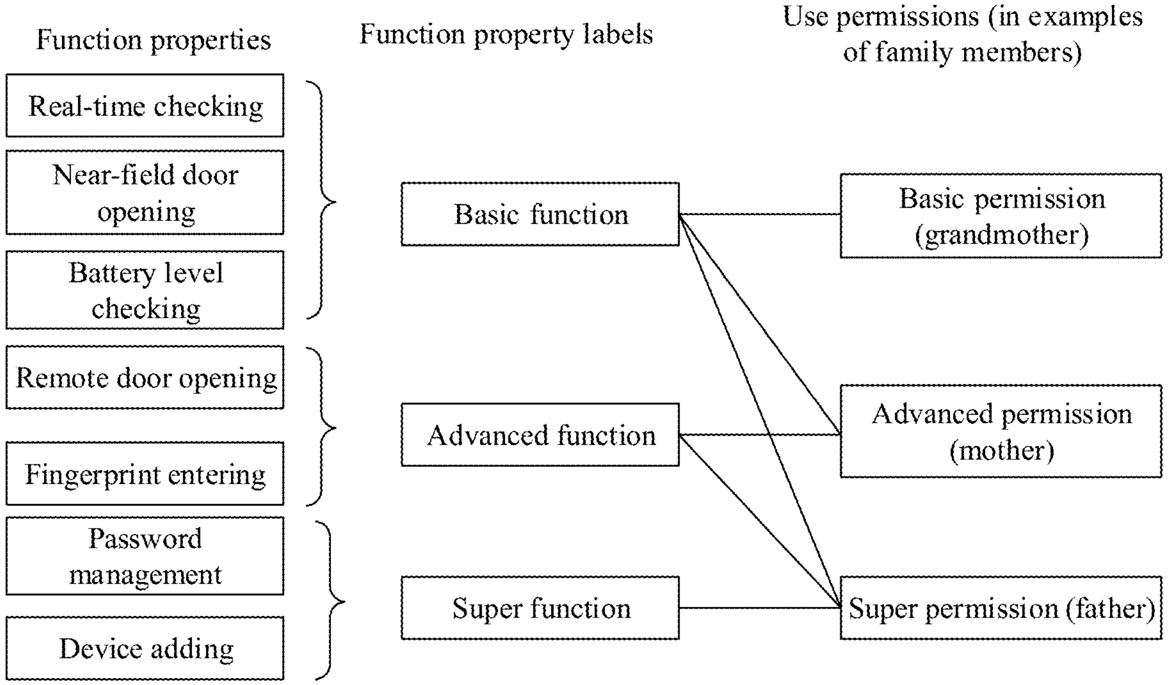
FIG. 15 is a schematic diagram of a function property, a function property label, and a use permission according to an embodiment of this application.

For example, as shown in FIG. 15, if the person to be shared with (the family member) is grandmother, and a permission corresponding to grandmother is the basic permission, grandmother can use basic functions such as real-time checking, near-field door opening, and battery level checking; if the person to be shared with (the family member) is mother, and a permission corresponding to mother is the advanced permission, mother can not only use the basic functions such as real-time checking, near-field door opening, and battery level checking, but can also use advanced functions such as remote door opening and fingerprint entering; and if the person to be shared with (the family member) is father, and a permission corresponding to father is the super permission, father can use the basic functions such as real-time checking, near-field door opening, and battery level checking, the advanced functions such as remote door opening and fingerprint entering, and super functions such as password management and device adding.

1304: The cloud server may generate a first plug-in based on a matching result.

For example, when the matching result (a first matching result) is that the person to be shared with is allowed to use the basic function, but is not allowed to use the advanced function or the super function, the first plug-in may be a plug-in that includes the basic function of the smart door lock. Alternatively, the first plug-in may be a plug-in that includes all functions of the smart door lock, where the basic function part is available, and another function (a function other than the basic function in the advanced function or the super function) is disabled. When the matching result is that the person to be shared with is allowed to use the advanced function but is not allowed to use the super function, the first plug-in may be a plug-in that includes the advanced function of the smart door lock. Alternatively, the first plug-in may be a plug-in that includes all functions of the smart door lock, where the advanced function part is available, and another function (a function other than the advanced function in the super function) is disabled. When the matching result is that the person to be shared with is allowed to use the super function, the first plug-in may be a plug-in that includes all functions of the smart door lock. The plug-in may be a program written for a specific application (for example, a smart household APP), and may be configured to add a function of the specific application.

1305: The cloud server delivers the first plug-in to a device (for example, the mobile phone B) corresponding to the person to be shared with.

1306: The mobile phone B installs the first plug-in.

As shown in FIG. 8A, after the user taps an accept button 333, the mobile phone B may receive the first plug-in from the cloud server, and install the first plug-in.

1307: The mobile phone B displays a control interface of the smart door lock, where the control interface of the smart door lock includes some functions of the smart door lock.

After installing the first plug-in, the mobile phone B may add a corresponding function of the smart door lock to the smart household APP, so that the mobile phone B can display the control interface of the smart door lock. The control interface of the smart door lock includes some functions of the smart door lock. If a permission of a user corresponding to the mobile phone B is the basic permission, the control interface of the smart door lock displayed on the mobile phone B may include the basic function of the smart door lock. If the permission of the user corresponding to the mobile phone B is the advanced permission, the control interface of the smart door lock displayed on the mobile phone B may include the advanced function of the smart door lock. If the permission of the user corresponding to the mobile phone B is the super permission, the control interface of the smart door lock displayed on the mobile phone B may include all functions of the smart door lock.

In this embodiment of this application, functions of a smart household device are distinguished by using different function property labels, and then the use permission of the user is matched with the function property label of the smart household device (the smart door lock), so that users with different use permissions can use different functions of the smart household device (the smart door lock). For example, the basic user (for example, grandmother) can use the basic functions such as real-time checking, near-field door opening, and battery level checking, the advanced user (for example, mother) can not only use the basic functions such as real-time checking, near-field door opening, and battery level checking, but can also use the advanced functions such as remote door opening and fingerprint entering, and the super user (for example, father) can use the basic functions such as real-time checking, near-field door opening, and battery level checking, the advanced functions such as remote door opening and fingerprint entering, and the super functions such as password management and device adding. In this way, security of sharing the smart household device is higher, and privacy protection is better.

Step 1301 may be performed by the discovery/connection module 106 in FIG. 2. Step 1302 may be performed by the device sharing module 101 in FIG. 2. Step 1303 and step 1304 may be performed by the permission matching module 203 in FIG. 2. Step 1305 may be performed by the communication module 204 in FIG. 2. Step 1306 may be performed by the processing module 304 in FIG. 2. Step 1307 may be performed by the device display module 301 in FIG. 2.

Figure 16:
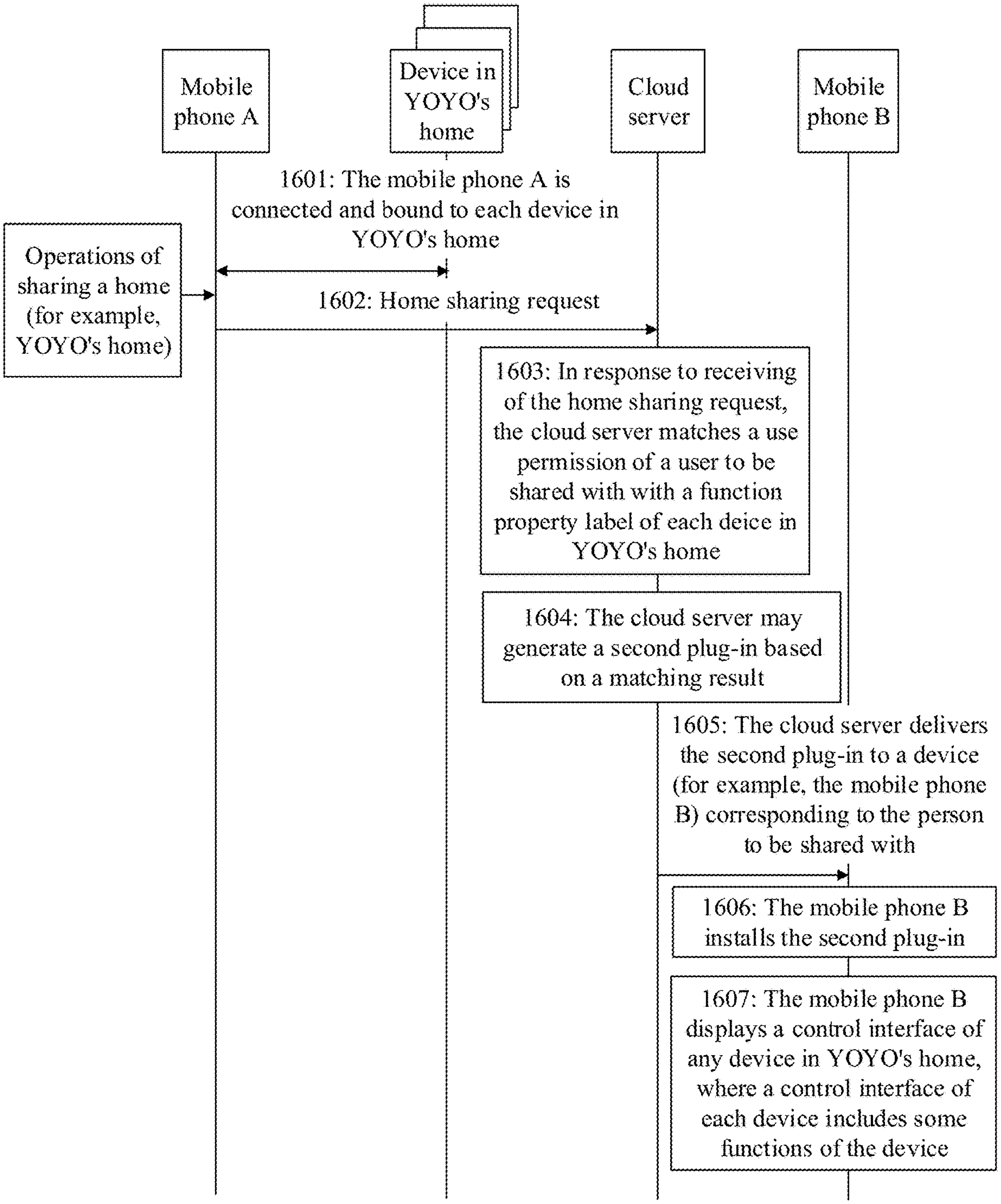
FIG. 16 is another schematic diagram of signal interaction according to an embodiment of this application.

As shown in FIG. 16, an embodiment of this application provides a method for sharing a device. The method is described by using an example in which a first electronic device is a mobile phone A and a second electronic device is a mobile phone B. The method includes the following steps.

1601: The mobile phone A is connected and bound to a smart door lock.

1602: In response to an operation that a user shares a home, the mobile phone A sends a home sharing request to a cloud server.

For example, as shown in FIG. 11A, in response to an operation that a user YOYO shares a home (YOYO's home, that is, a target home), the mobile phone A may send the home sharing request to the cloud server.

The home sharing request may carry an identifier of a family member (for example, Amy, that is, a target user) selected by the user YOYO, and permission information of the family member. The identifier of the family member may include information such as an application account (for example, an Honor account or a WeChat® account) of the family member or an ID of a device (for example, the mobile phone B) used by the family member. A permission of the family member (for example, Mary or Amy) may be manually set by the user (for example, YOYO). The permission of the family member may be a basic permission, an advanced permission, or a super permission.

1603: In response to receiving of the home sharing request, the cloud server matches a use permission of a user to be shared with with function property labels of all smart devices in the shared home.

The cloud server may match the use permission of the user to be shared with with a function property label of each of all the smart devices in the shared home. For a specific matching process, refer to the process in step 1303 in which the cloud server matches the use permission of the user to be shared with with the function property label of the smart door lock. Details are not described herein again.

1604: The cloud server may generate a second plug-in based on a matching result.

For example, when the matching result (a second matching result) is that the person to be shared with is allowed to use the basic function, but is not allowed to use the advanced function or the super function, the second plug-in may be a plug-in that includes basic functions of all devices in YOYO's home. The plug-in may be a program written for a specific application (for example, a smart household APP), and may be configured to add a function of the specific application. Alternatively, the second plug-in may be a plug-in that includes all functions of all devices in YOYO's home, where the basic function part is available, and other functions (the advanced function and the super function) are disabled. When the matching result is that the person to be shared with is allowed to use the advanced function but is not allowed to use the super function, the second plug-in may be a plug-in that includes advanced functions of all the devices in YOYO's home. Alternatively, the second plug-in may be a plug-in that includes all functions of all the devices in YOYO's home, where the advanced function part is available, and another function (the super function) is disabled. When the matching result is that the person to be shared with is allowed to use the super function, the second plug-in may be a plug-in that includes all functions of all the devices in YOYO's home.

1605: The cloud server delivers the second plug-in to a device (for example, the mobile phone B) corresponding to the person to be shared with.

1606: The mobile phone B installs the second plug-in.

As shown in FIG. 12D, after the user taps an accept button 387, the mobile phone B may receive the second plug-in from the cloud server, and install the second plug-in.

1607: The mobile phone B displays a control interface of any device in YOYO's home, where a control interface of each device includes some functions of the device.

After installing the second plug-in, the mobile phone B may add basic functions of all the devices in YOYO's home to the smart household APP, so that the mobile phone B can display a control interface of any device (for example, a television set) in YOYO's home. The control interface of the device includes some functions of the device. If a permission of the user corresponding to the mobile phone B is the basic permission, the control interface of the television set displayed on the mobile phone B may include a basic function of the television set. If the permission of the user corresponding to the mobile phone B is the advanced permission, the control interface of the television set displayed on the mobile phone B may include an advanced function of the television set. If the permission of the user corresponding to the mobile phone B is the super permission, the control interface of the television set displayed on the mobile phone B may include all functions of the television set.

Step 1601 may be performed by the discovery/connection module 106 in FIG. 2. Step 1602 may be performed by the device sharing module 101 in FIG. 2. Step 1603 and step 1604 may be performed by the permission matching module 203 in FIG. 2. Step 1605 may be performed by the communication module 204 in FIG. 2. Step 1606 may be performed by the processing module 304 in FIG. 2. Step 1607 may be performed by the device display module 301 in FIG. 2.

Based on the method provided in this embodiment of this application, when the target home is to be shared with the target user, a use permission may be specified for the target user, and different use permissions allow the target user to use different function properties of a device in the target home. In other words, users with different use permissions can use different functions of the device (for example, the smart door lock) in the target home. In this way, security of sharing the device (a smart household device) is higher, and privacy protection is better.

Figure 17:
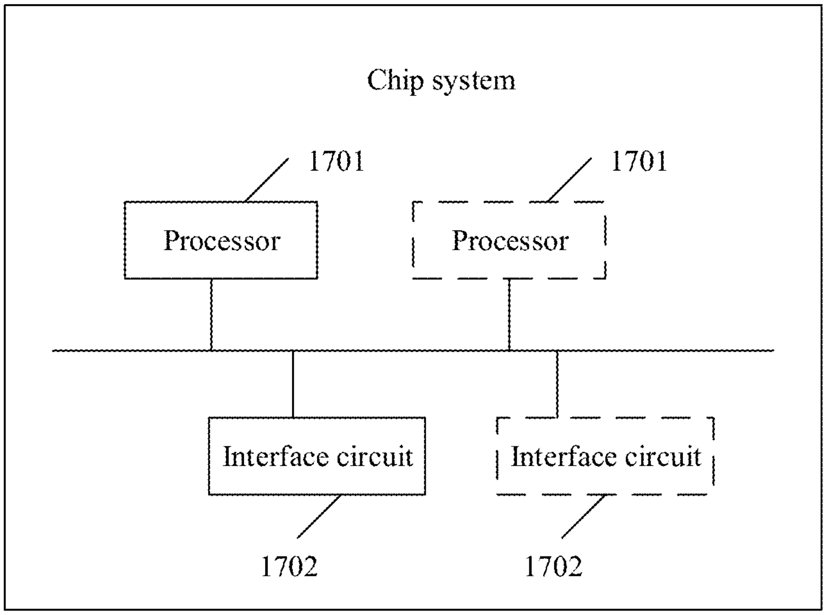
FIG. 17 is a schematic diagram of a structure of a chip system according to an embodiment of this application.

An embodiment of this application further provides a chip system. As shown in FIG. 17, the chip system includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of an electronic device). For another example, the interface circuit 1702 may be configured to send a signal to another apparatus (for example, the processor 1701).

For example, the interface circuit 1702 may read instructions stored in the memory of the electronic device, and send the instructions to the processor 1701. When the instructions are executed by the processor 1701, a first electronic device, a second electronic device (for example, the electronic device 200 shown in FIG. 3), or a cloud server may be enabled to perform the steps in the foregoing embodiments.

Certainly, the chip system may further include another discrete component. This is not specifically limited in this embodiment of this application.

An embodiment of this application further provides a computer-readable storage medium. The computer-readable storage medium includes computer instructions. When the computer instructions are run on a first electronic device, a second electronic device (for example, the electronic device 200 shown in FIG. 3), or a cloud server, the first electronic device, the second electronic device (for example, the electronic device 200 shown in FIG. 3), or the cloud server is enabled to perform functions or steps performed by the mobile phone A, the mobile phone B, or the cloud server in the foregoing method embodiments.

An embodiment of this application further provides a computer program product. When the computer program product runs on a computer, the computer is enabled to perform functions or steps performed by the first electronic device, the second electronic device, or the cloud server in the foregoing method embodiments.

An embodiment of this application further provides an apparatus for sharing a device. The apparatus can be divided into different logical units or modules according to functions, and the units or modules perform different functions, so that the apparatus performs functions or steps performed by the first electronic device, the second electronic device, or the cloud server in the foregoing method embodiments.

The foregoing descriptions about implementations allow a person skilled in the art to clearly understand that the foregoing functions can be allocated to different functional modules and implemented according to a requirement, that is, an inner structure of the apparatus is divided into different functional modules to implement all or some functions described above.

In the embodiments provided in this application, it should be understood that the disclosed apparatuses and methods may be implemented in another manner. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of the embodiments.

In addition, functional units in the embodiments of this application may be integrated into one processing unit, each of the units may exist alone physically, or two or more units may be integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in the embodiments of this application. The storage medium includes various media that can store program code, for example, a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A method for sharing a device, wherein the method comprises:

displaying, by a first electronic device, a first interface, wherein the first interface comprises a first control and one or more to-be-shared devices, and the first control is configured to indicate that the first interface is an interface for sharing a device;

receiving, by the first electronic device, an operation that a user selects a target device from the one or more to-be-shared devices;

receiving, by the first electronic device, an operation that the user selects a target user;

displaying, by the first electronic device, a second interface, wherein the second interface comprises a plurality of options, different options in the plurality of options correspond to different use permissions, and different use permissions allow the target user to use different function properties;

receiving, by the first electronic device, an operation that the user selects a target option from the plurality of options;

receiving, by the first electronic device, an operation that the user determines to share the target device with the target user by using a use permission corresponding to the target option;

sending, by the first electronic device, a device sharing request to a second electronic device via a cloud server, wherein the device sharing request carries an identifier of the target user and a use permission of the target user; and causing the second electronic device to display a third interface, wherein the third interface comprises a first control corresponding to a function property that is of the target device and that the target user is allowed to use, and the first control is in an operable state.

2. The method according to claim 1, wherein the receiving, by the first electronic device, an operation of selecting a target user comprises:

displaying, by the first electronic device, a fourth interface, wherein the fourth interface comprises one or more sharing protocols used to share the target device; and receiving, by the first electronic device, an operation that the user selects a first sharing protocol from the one or more sharing protocols used to share the target device, and receiving an operation that the user selects the target user by using the first protocol; or displaying, by the first electronic device, a fifth interface, wherein the fifth interface comprises one or more sharing protocols used to share the target device and an option used to directly share the target device with one or more users; and receiving, by the first electronic device, an operation that the user selects the target user from the option used to directly share the target device with one or more users.

3. The method according to claim 1, wherein the cloud server is configured to:

receive the device sharing request, and matching the use permission of the target user with a function property label of the target device to obtain a first matching result, wherein the function property label is used to describe a type of a function property of the target device, and the matching result is used to indicate a function property that the target user is allowed to use and a function property that the target user is not allowed to use;

generate a first plug-in based on the first matching result, wherein the first plug-in comprises the function property that the target user is allowed to use; and send the first plug-in to the second electronic device to allow the second electronic device to install the first plug-in.

4. The method according to claim 1, wherein types of function properties are classified based on at least one of operation complexity security requirements, or roles of the function properties.

5. The method according to claim 4, wherein the function property comprises at least one of the following fields: a property identifier ID, a data type, and an access manner, and the access manner comprises at least one of reading, writing, listening, or setting to null.

6. The method according to claim 1, wherein the method further comprises:

establishing, by the first electronic device, a communication connection and binding to the target device.

7. The method according to claim 1, wherein the method further comprises:

in response to an operation that the user opens a control interface of the target device, displaying, by the first electronic device, the control interface of the target device, wherein the control interface displayed on the first electronic device comprises a second control corresponding to all function properties of the target device, and the second control is in an operable state.

8. The method according to claim 1, wherein the use permission of the target user is set by the first electronic device by default.

9. The method according to claim 1, wherein the plurality of options respectively correspond to a first permission, a second permission, and a third permission, wherein the first permission is used to indicate that a first function property of the target device is allowed to be directly used, the second permission is used to indicate that a second function property of the target device is allowed to be directly used, the third permission is used to indicate that a third function property of the target device is allowed to be directly used, and the first function property, the second function property, and the third function property are not entirely the same.

10. The method according to claim 9, wherein if the target device is a door lock device, the first function property comprises at least one of real-time status checking, near-field door opening, or battery level checking;

the second function property comprises the first function property and at least one of remote door opening or biological information entering; and the third function property comprises the second function property and at least one of password management or checking a historical video of a camera.

11. The method according to claim 8, wherein the permission of the target user is a fourth permission, the fourth permission is used to indicate that a fourth function property of the target device is allowed to be directly used, and that a fifth function property of the target device is allowed to be used after a preset password is entered, and the fourth function property is different from the fifth function property.

12. The method according to claim 1, wherein the cloud server is further configured to receive a device profile of the target device from the target device or the first electronic device, wherein the device profile comprises a plurality of function properties of the target device, and each of the plurality of function properties corresponds to one function property label.

13. The method according to claim 3, wherein the first plug-in comprises all the function properties of the target device, and in all the function properties, the function property that the target user is allowed to use is readable and writable, and the function property that the target user is not allowed to use is unreadable and unwritable; or the first plug-in comprises only the function property that the target user is allowed to use in all the function properties of the target device, and the function property that the target user is allowed to use is readable and writable.

14. The method according to claim 7, wherein the second electronic device is further configured to:

display the first control, wherein the first control is in an operable state; or the second control corresponding to all the function properties of the target device is displayed, wherein the second control comprises the first control and a third control corresponding to the function property that the target user is not allowed to use, the first control is in an operable state, and the third control is set to gray.

15. A non-transitory computer-readable storage medium storing computer-readable instructions, which when executed, cause a first electronic device to at least:

display a first interface, wherein the first interface comprises a first control and one or more to-be-shared devices, and the first control is configured to indicate that the first interface is an interface for sharing a device;

receive an operation that a user selects a target device from the one or more to-be-shared devices;

receive an operation that the user selects a target user;

display a second interface, wherein the second interface comprises a plurality of options, different options in the plurality of options correspond to different use permissions, and different use permissions allow the target user to use different function properties;

receive an operation that the user selects a target option from the plurality of options;

receive an operation that the user determines to share the target device with the target user by using a use permission corresponding to the target option; and send a device sharing request to a second electronic device via a cloud server, wherein the device sharing request carries an identifier of the target user and a use permission of the target user; wherein the second electronic device is configured to display a third interface, wherein the third interface comprises a first control corresponding to a function property that is of the target device and that the target user is allowed to use, and the first control is in an operable state.

16. The non-transitory computer-readable storage medium according to claim 15, wherein the cloud server is configured to:

receive the device sharing request, and match the use permission of the target user with a function property label of the target device to obtain a first matching result, wherein the function property label is used to describe a type of a function property of the target device, and the matching result is used to indicate a function property that the target user is allowed to use and a function property that the target user is not allowed to use;

generate a first plug-in based on the first matching result, wherein the first plug-in comprises the function property that the target user is allowed to use; and send the first plug-in to the second electronic device, wherein the second electronic device is configured to install the first plug-in.

17. The non-transitory computer-readable storage medium according to claim 15, wherein the receiving an operation of selecting a target user comprises:

displaying a fourth interface, wherein the fourth interface comprises one or more sharing protocols used to share the target device; and receiving an operation that the user selects a first sharing protocol from the one or more sharing protocols used to share the target device, and receiving an operation that the user selects the target user by using the first protocol; or displaying a fifth interface, wherein the fifth interface comprises one or more sharing protocols used to share the target device and an option used to directly share the target device with one or more users; and receiving an operation that the user selects the target user from the option used to directly share the target device with one or more users.

18. A first electronic device, comprising one or more processors and a memory, wherein the memory is coupled to the one or more processors, the memory is configured to store computer program code, the computer program code comprises computer instructions, and the one or more processors invoke the computer instructions to cause the first electronic device to:

display a first interface, wherein the first interface comprises a first control and one or more to-be-shared devices, and the first control is configured to indicate that the first interface is an interface for sharing a device;

receive an operation that a user selects a target device from the one or more to-be-shared devices;

receive an operation that the user selects a target user;

display a second interface, wherein the second interface comprises a plurality of options, different options in the plurality of options correspond to different use permissions, and different use permissions allow the target user to use different function properties;

receive an operation that the user selects a target option from the plurality of options;

receive an operation that the user determines to share the target device with the target user by using a use permission corresponding to the target option;

send a device sharing request to a second electronic device via a cloud server, wherein the device sharing request carries an identifier of the target user and a use permission of the target user; wherein the second electronic device is configured to display a third interface, wherein the third interface comprises a first control corresponding to a function property that is of the target device and that the target user is allowed to use, and the first control is in an operable state.

19. The first electronic device according to claim 18, wherein the cloud server is configured to:

receive the device sharing request, and match the use permission of the target user with a function property label of the target device to obtain a first matching result, wherein the function property label is used to describe a type of a function property of the target device, and the matching result is used to indicate a function property that the target user is allowed to use and a function property that the target user is not allowed to use;

generate a first plug-in based on the first matching result, wherein the first plug-in comprises the function property that the target user is allowed to use; and send the first plug-in to the second electronic device, wherein the second electronic device is configured to install the first plug-in.

20. The first electronic device according to claim 18, wherein receiving an operation of selecting a target user comprises:

displaying a fourth interface, wherein the fourth interface comprises one or more sharing protocols used to share the target device; and receiving an operation that the user selects a first sharing protocol from the one or more sharing protocols used to share the target device, and receiving an operation that the user selects the target user by using the first protocol; or displaying a fifth interface, wherein the fifth interface comprises one or more sharing protocols used to share the target device and an option used to directly share the target device with one or more users; and receiving an operation that the user selects the target user from the option used to directly share the target device with one or more users.

* * * * *